(12) United States Patent
Morris

(10) Patent No.: US 9,460,881 B1
(45) Date of Patent: Oct. 4, 2016

(54) COMPACT PLUG AND SOCKET UNIT ISOLATOR SYSTEMS FOR MOTOR CONTROL CENTERS (MCC) AND RELATED MCC CABINETS

(71) Applicant: Eaton Corporation, Cleveland, OH (US)

(72) Inventor: Robert Allan Morris, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/700,895

(22) Filed: Apr. 30, 2015

(51) Int. Cl.
  *H01H 71/02* (2006.01)
  *H01R 13/42* (2006.01)
  *H02B 1/04* (2006.01)

(52) U.S. Cl.
  CPC .......... *H01H 71/0207* (2013.01); *H01R 13/42* (2013.01)

(58) Field of Classification Search
  CPC ............ H02B 1/04; H02B 1/18; H02B 1/26; H02B 1/015; H02B 1/056; H02B 5/00; H02B 13/02; H02B 1/46; H05K 7/18; H05K 7/186; H05K 13/00; H01R 9/24; H01H 3/20; H01H 9/04
  USPC ....... 361/622, 624, 627, 629, 632, 634, 636, 361/637, 640, 652, 657, 673, 724–728; 439/82, 248, 709, 710, 712, 713, 715, 439/716; 174/68.2, 71 B, 72 B, 84 R, 88 B, 174/88 S; 200/50.08, 50.11, 50.21, 50.27, 200/294
  See application file for complete search history.

(56) References Cited

U.S. PATENT DOCUMENTS

| | | | | |
|---|---|---|---|---|
| 3,160,791 A | * | 12/1964 | Jacobs | H01H 85/2045 337/197 |
| 3,211,960 A | * | 10/1965 | Dorfman | H02B 1/056 200/294 |
| 3,590,199 A | * | 6/1971 | Maier | H02B 1/056 200/293 |
| 4,024,441 A | | 5/1977 | Coyle et al. | |
| 4,503,408 A | | 3/1985 | Mrenna et al. | |
| 5,910,760 A | | 6/1999 | Malingowski et al. | |
| 5,995,362 A | * | 11/1999 | Morel | H02B 1/21 361/611 |
| 6,062,914 A | * | 5/2000 | Fasano | H01H 71/08 361/634 |
| 6,086,388 A | * | 7/2000 | Sloey | H01R 25/14 361/636 |
| 6,315,580 B1 | * | 11/2001 | Hurtubise | H01H 73/08 361/627 |
| 6,317,311 B1 | * | 11/2001 | Middlehurst | H02B 1/056 361/637 |

(Continued)

OTHER PUBLICATIONS

Distribution Products Catalog, Molded Case Circuit Breakers Series G, EATON, Sep. 2010, p. 109.

(Continued)

*Primary Examiner* — Michail V Datskovskiy
(74) *Attorney, Agent, or Firm* — Myers Bigel & Sibley, P.A.

(57) ABSTRACT

Circuit breakers with cooperating plug and socket assemblies which are configured as separate spaced apart components, with plugs and sockets held spaced apart from the circuit breaker body, typically above the top of the circuit breaker body. The plug assembly can have a short compact profile and can include pairs of plugs held by an insulated support with a compact spacing between adjacent pairs and upper and lower plugs of each plug pair. The plug assembly can be attached to a racking frame to allow the plug assembly to be retracted during a rack-out action of the unit from a motor control center.

23 Claims, 20 Drawing Sheets

(56) References Cited

U.S. PATENT DOCUMENTS

| | | | | |
|---|---|---|---|---|
| 6,359,770 B1* | 3/2002 | Kolody | ............... | H01R 12/7088 |
| | | | | 361/626 |
| 6,530,811 B1* | 3/2003 | Padulo | .................. | H01H 73/08 |
| | | | | 361/634 |
| 7,027,293 B2* | 4/2006 | Yang | ...................... | H02B 1/205 |
| | | | | 200/50.27 |
| 7,414,828 B2* | 8/2008 | Birner | .................... | H02B 1/056 |
| | | | | 174/68.2 |
| 7,419,394 B2* | 9/2008 | Jensen | .............. | H01R 13/6315 |
| | | | | 439/248 |
| 7,551,425 B2* | 6/2009 | Byrne | .................. | H01R 9/2458 |
| | | | | 174/68.2 |
| 7,684,199 B2 | 3/2010 | Yee et al. | | |
| 7,688,572 B2* | 3/2010 | Yee | ........................ | H02B 1/36 |
| | | | | 200/50.08 |
| 8,274,782 B2* | 9/2012 | Blodorn | .............. | H05K 7/1484 |
| | | | | 29/592.1 |
| 8,817,454 B2 | 8/2014 | Morris et al. | | |
| 8,913,372 B2* | 12/2014 | Aukofer | .................. | H01H 9/08 |
| | | | | 361/631 |
| 9,356,435 B2* | 5/2016 | Ricciuti | ................. | H02B 13/02 |
| 2008/0022673 A1 | 1/2008 | Morris et al. | | |
| 2008/0023211 A1 | 1/2008 | Yee et al. | | |
| 2008/0258667 A1 | 10/2008 | Morris et al. | | |
| 2009/0086414 A1 | 4/2009 | Yee et al. | | |
| 2012/0033351 A1 | 2/2012 | Morris et al. | | |
| 2013/0077210 A1 | 3/2013 | Morris | | |

OTHER PUBLICATIONS

Instruction Leaflet for Drawout Cassette for NG Frame Circuit Breakers, EATON, Cutler-Hammer, Jul. 2006, 5 pages.

Instruction Leaflet for LG-Frame Circuit Breakers and Motor Circuit Protectors, EATON, Feb. 2009, 2 pages.

Instruction Leaflet for Plug-in Block for EG, JG and LG frame Circuit Breakers, EATON, Sep. 2005, 4 pages.

Pierre et al., Practical Solution Guide to Arc Flash Hazards, EasyPower LLC, 2013, 141 pages.

Product Information, Molded Case Circuit Breakers, LG Series, Cutler Hammer, Division of EATON Corp, http://www.galco.com/buy/Cutler-Hammer-Div-of-Eaton-Corp . . . , date unknown but believed to be prior to the present application, printed from the Internet Mar. 2, 2015, 1 page.

* cited by examiner

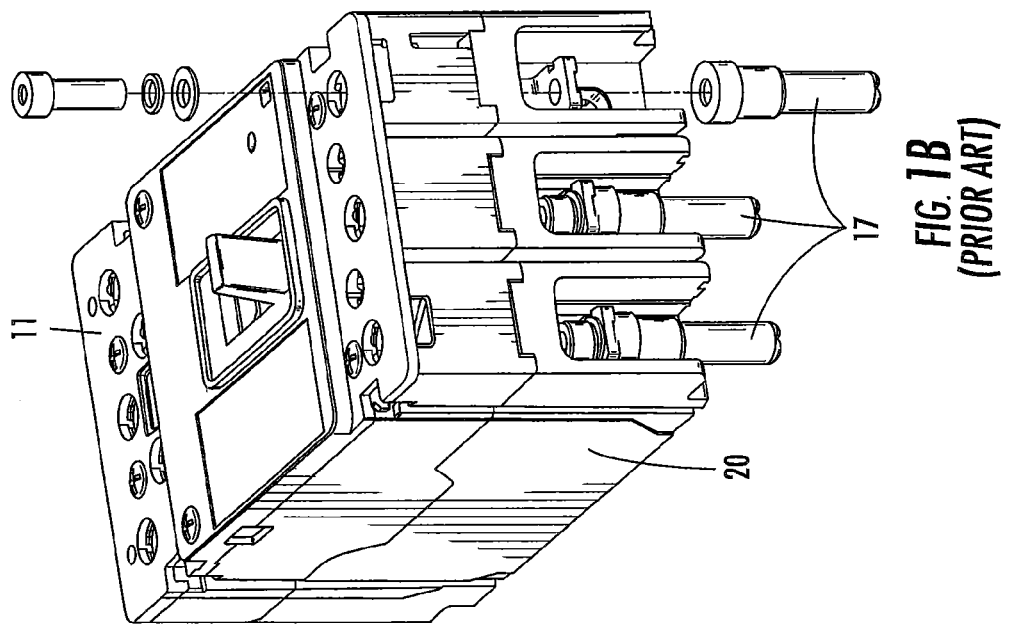
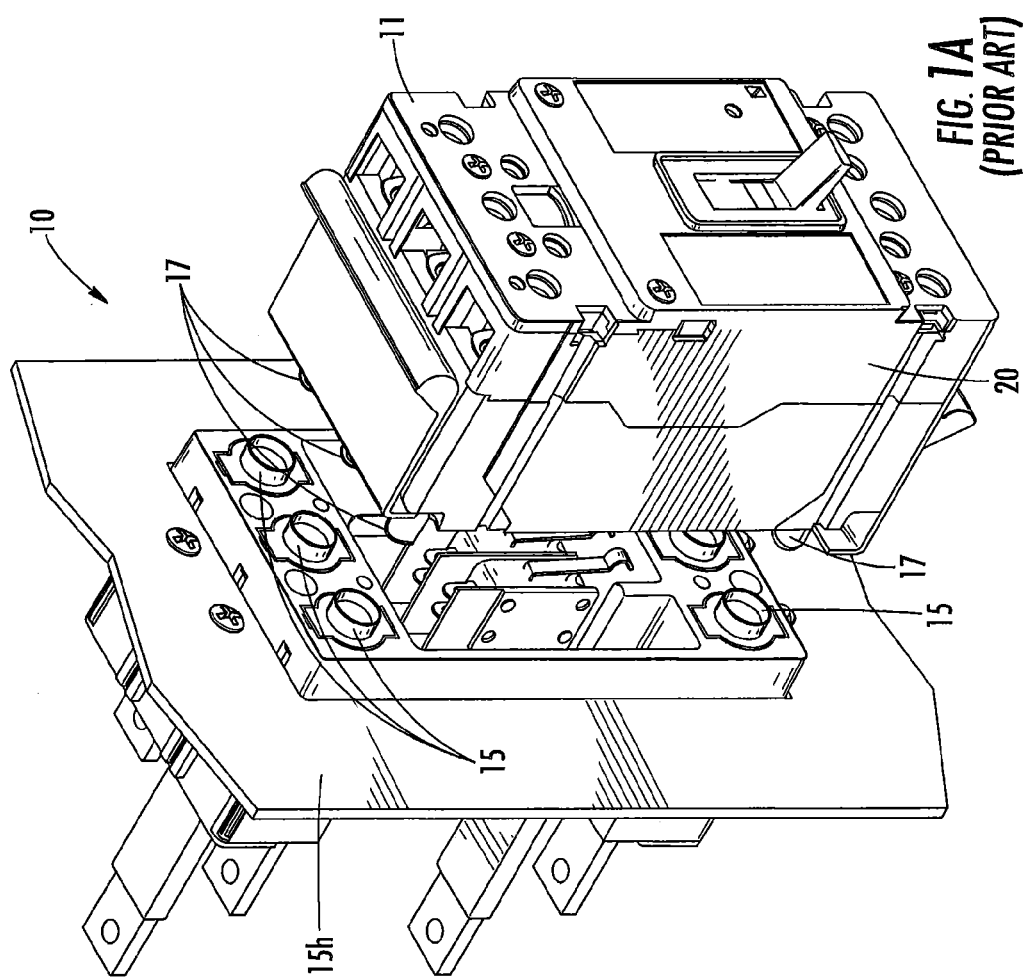
FIG. 1A (PRIOR ART)
FIG. 1B (PRIOR ART)

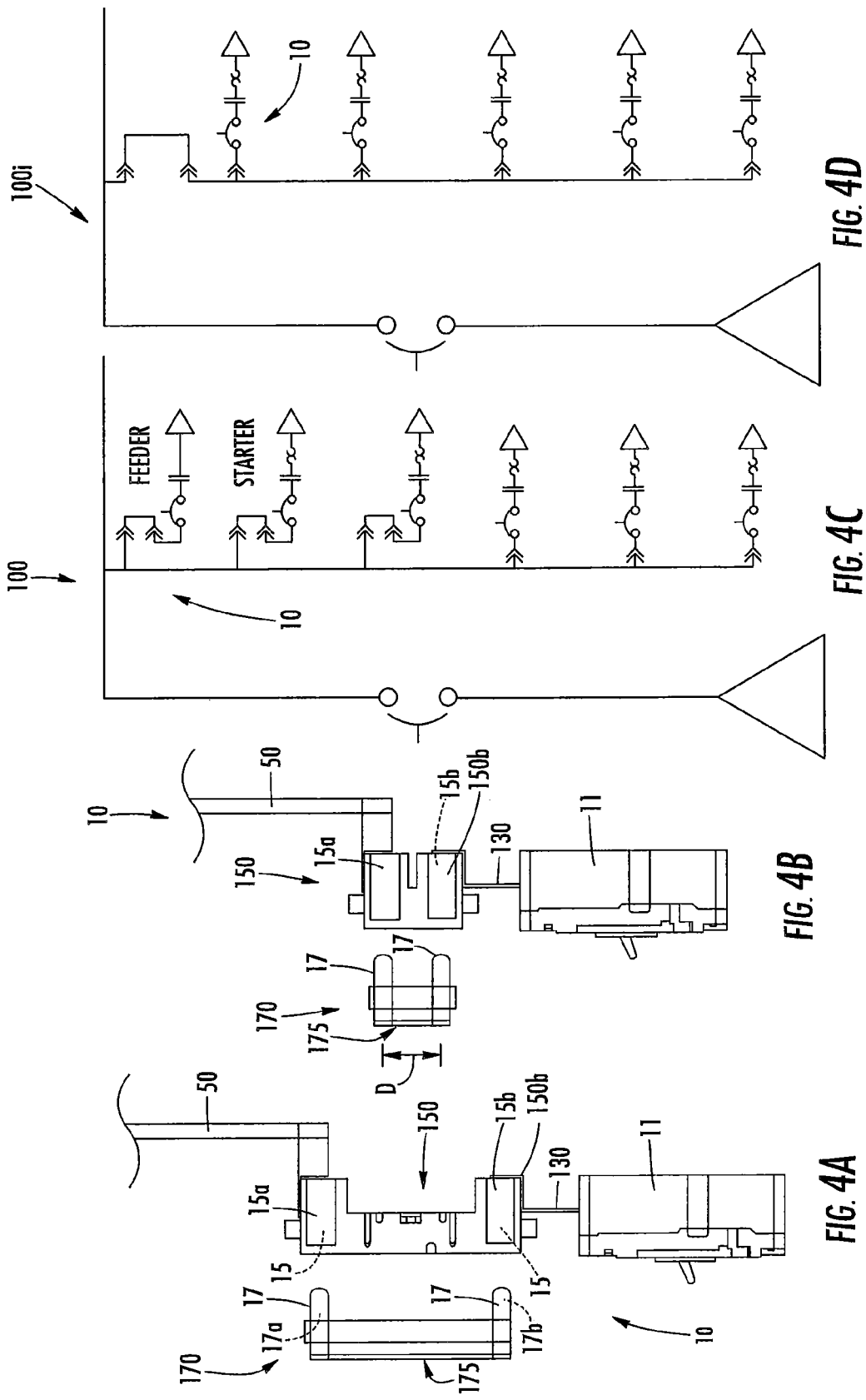

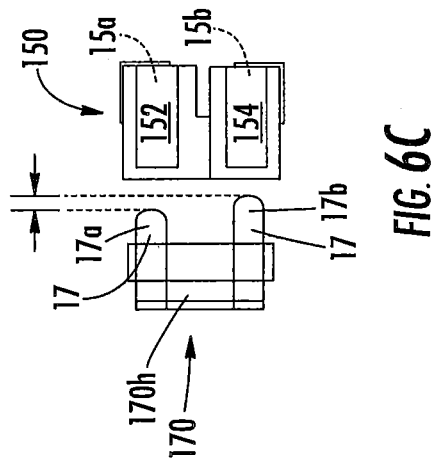
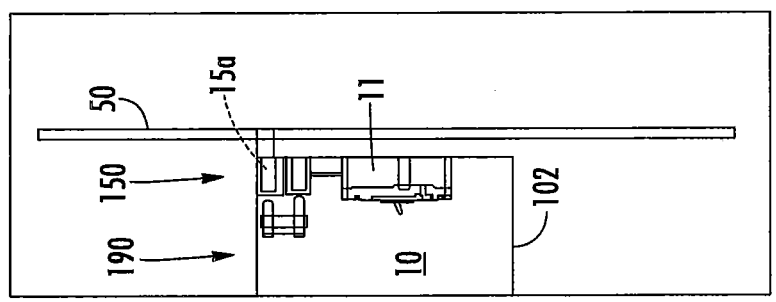
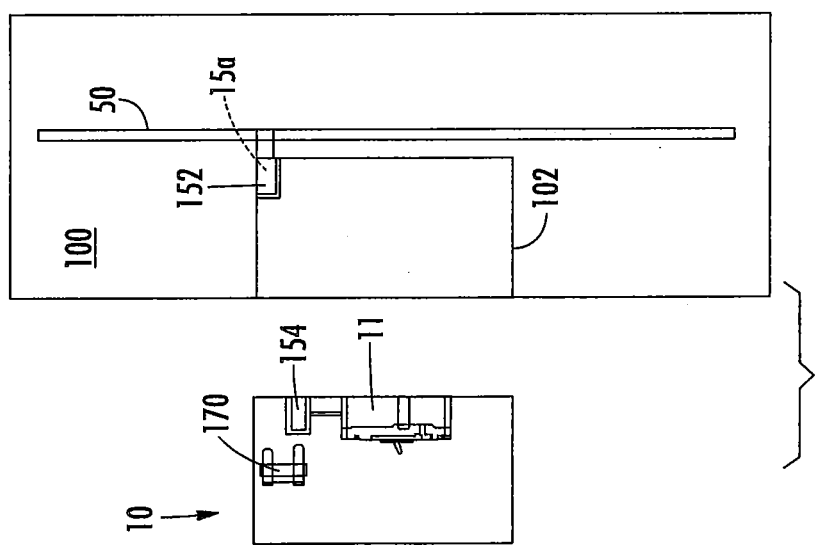

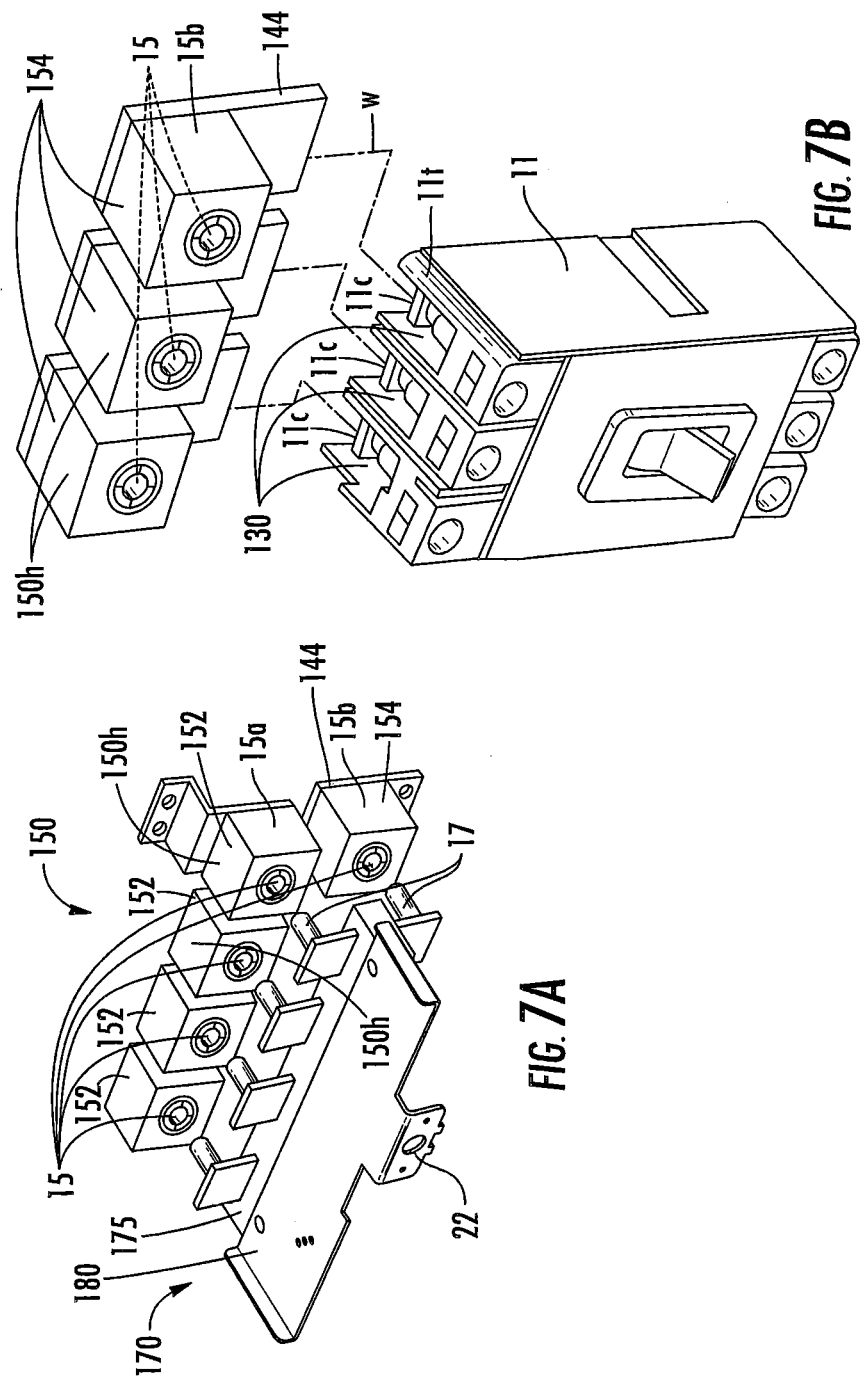

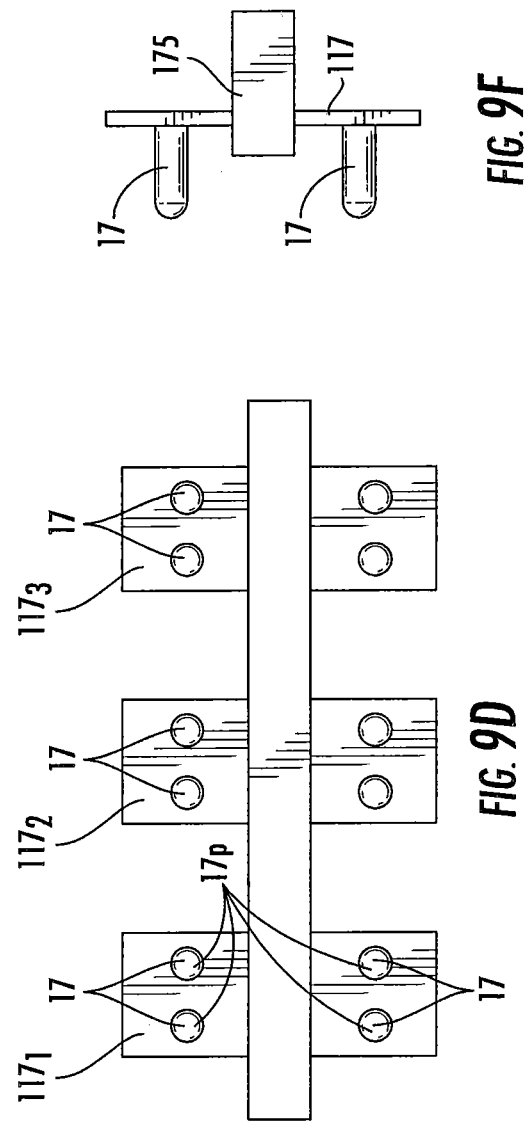
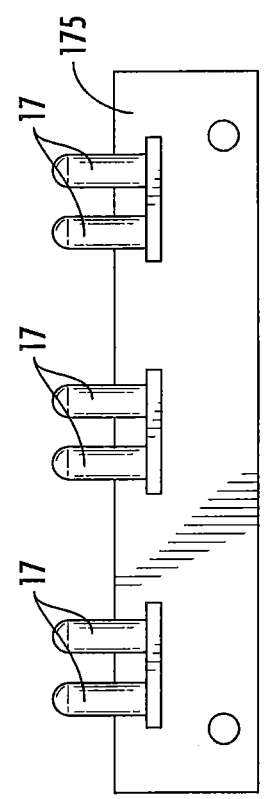
FIG. 9F
FIG. 9D
FIG. 9E

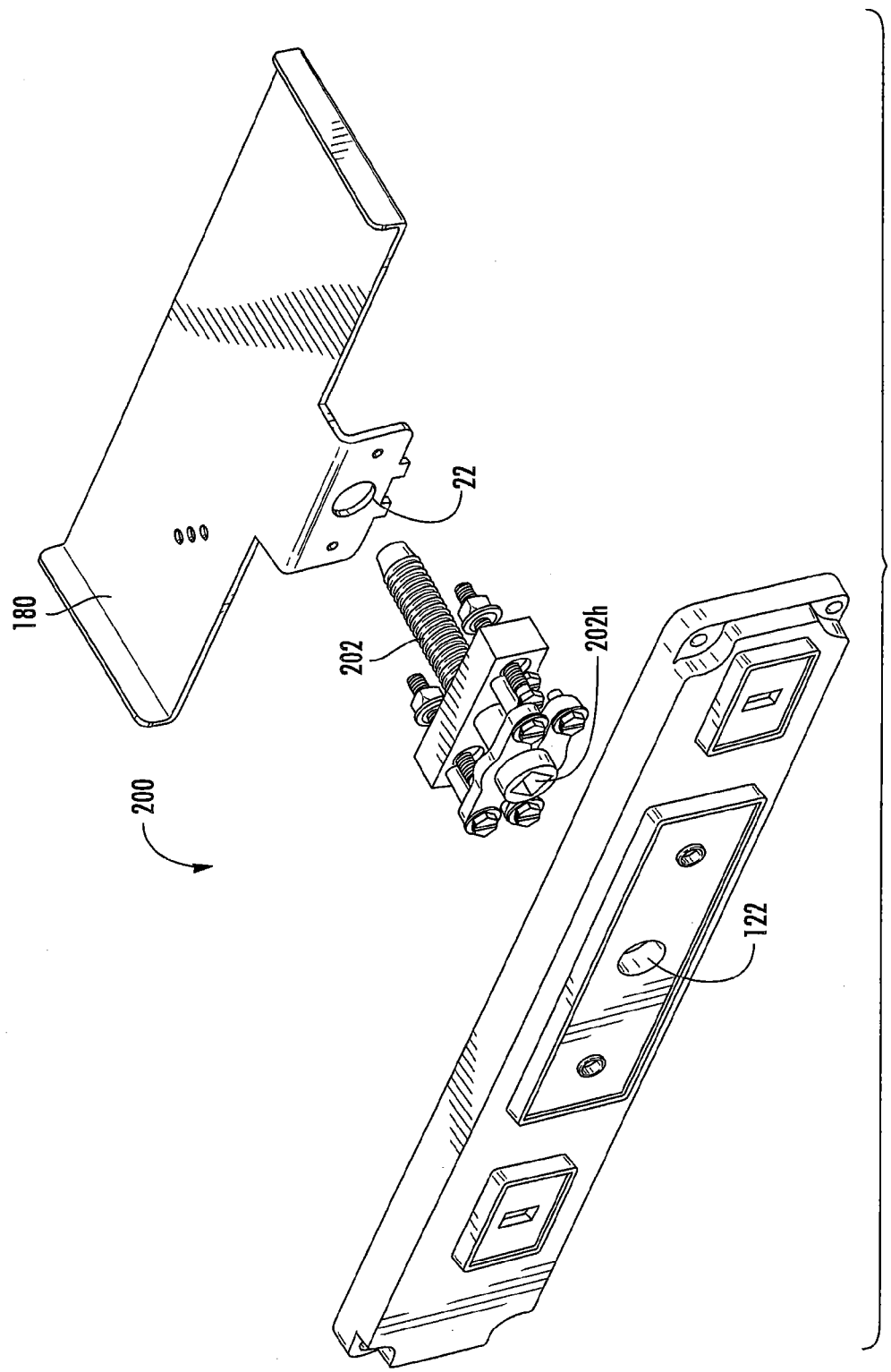

COMPACT PLUG AND SOCKET UNIT ISOLATOR SYSTEMS FOR MOTOR CONTROL CENTERS (MCC) AND RELATED MCC CABINETS

FIELD OF THE INVENTION

The present invention relates to motor control center units.

BACKGROUND OF THE INVENTION

As is known to those of skill in the art, Motor Control Centers (MCCs) can include cabinets or enclosures that hold multiple, typically modular, bucket assemblies or units of various sizes. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

An MCC is a multi-compartment steel enclosure with a bus system to distribute electrical power from a common bus to a plurality of individual motor control units mountable within the compartments. The individual motor control center units are commonly referred to as "buckets" or "units" and are typically constructed to be removable modular units that have, or are installed behind, individual sealed doors on the motor control center enclosure. These units may contain various motor control and motor protection devices such as motor controllers, starters, contactor assemblies, overload relays, circuit breakers, motor circuit protectors, various disconnects, and similar devices for electric motors. The units connect to the common power bus of the motor control center and conduct supply power to a line side of the motor control devices for operation of motors and feeder circuits. MCCs are often used in factories and industrial facilities that utilize high power electrical motors, pumps, and other loads. MCCs and units therefore (the latter is also sometimes called "subunits") are described in greater detail, for example, in commonly assigned U.S. Patent Application Publications 2009/0086414, 2008/0258667, 2008/0023211 and 2008/0022673, which are hereby incorporated herein by reference.

As shown in FIGS. 1A and 1B, MCCs can include units 10 with a circuit breaker 11 that can have an external accessory kit known as a "plug-in" arrangement. The plug-in arrangement can employ a stationary housing 15*h* (also known as a "plug-in block") that is hard-wired to the bus and has forward facing sockets 15 on respective line and load sides that are aligned with and slidably receive and release plugs 17 mounted on the rear of a drawout cassette 20 holding the circuit breaker 11. The plug-in configurations can be incorporated into a drawout accessory, which is a plug-in arrangement with a racking mechanism accessible via a portal to engage a lever, crank or screw to move the breaker 11 to connect and withdrawn positions. FIG. 2 shows a MCC unit or bucket 10 that can be manually inserted into an empty cell or compartment of an MCC cabinet. Once secured with a unit interlock and the unit door closed, the plugs 17 can be racked in using a speed wrench which can be applied through a portal (such as portal 122 as shown in FIG. 11B). This can be described as a "FLASH-GARD" configuration as it can provide additional operator safety and protection from an arc flash while inserting a bucket/unit when the cell door is securely closed.

FIGS. 3A and 3B illustrate an exemplary prior art schematic of a LG drawout breaker in an MCC as a vertical bus isolator. It is believed that some conventional MCC stab designs moved through about 1.75-2 inches of displacement from operational position to a disengaged (racked out) position of the stabs from the bus.

SUMMARY OF EMBODIMENTS OF THE INVENTION

Embodiments of the invention provide new plug and socket unit isolator systems that position the plugs apart from the disconnect switch, e.g. breaker or fused disconnect switch, allowing for a more compact stationary socket housing or "plug-in block" and/or a closer spacing between line and load side plugs and sockets relative to conventional configurations.

The isolator systems may be particularly suitable for one or more of 125 A, 250 A, 400 A, 600 A and 1200 A applications of different frame configurations.

Embodiments of the invention are directed to unit isolator systems with compact plug and socket configurations which have a double break arrangement and can reduce travel requirements of a stab for isolation.

Embodiments of the invention are directed to single phase cassettes configured with sequenced operation allowing a center phase to engage first so that defined plugs engage electrical inputs/sockets in a stepped manner which can reduce racking forces on initial contact of a plug to socket. The stepped plug sequence can reduce plug-in forces associated with configurations that allow the plugs to engage the socket at the same time, which can generate a very high plug-in force and put a strain on the racking mechanism and housing, which sequencing can reduce.

Embodiments of the invention are directed to plug and socket assemblies for a unit. The assemblies include a device having a body and electrical contacts, a plug assembly with at least a first pair of line and load side plugs facing outward from an insulated support; and a socket assembly with at least a first pair of line and load side sockets aligned with the first pair of plugs and configured to releasably receive the first pair of plugs. The plug assembly is separate from the disconnect body including when the first pair of plugs reside in the first pair of the line and load side sockets.

The plug assembly can also include second and third pairs of laterally spaced apart line and load side plugs held on the insulated support on conductive bars, each of the second and third pairs of plugs having at least one plug extending above and at least one plug extending below the insulated support.

The line and load side plugs of each of the first, second and third pairs of plugs can have a vertical separation distance of between about 2 and about 4 inches.

At least the first pair of plugs includes parallel, adjacent first and second line-side plugs held by the insulated support residing above a corresponding first and second parallel, adjacent load-side plugs held by the insulated support.

The device with the electrical contacts can be a disconnect with a disconnect body. The socket assembly can include a line side set of sockets fixedly attached to a bus of an MCC cabinet and a load side set of sockets electrically connected to but spaced apart above a top of the disconnect body.

The line side and load side sets of sockets and the plugs can all reside above the disconnect body by between about 2-4 inches.

The first plug pair and the first socket pair can be configured to electrically engage the load side before the line side.

The device can be a molded case circuit breaker (MCCB). The socket assembly can include the first pair of line and load side sockets as well as second and third laterally spaced apart pairs of line and load side sockets. The load side sockets can be spaced vertically apart from while electrically connected to the electrical contacts in a top portion of the MCCB. The line side sockets can be stationary and in electrical communication with a line side of a circuit of a respective unit.

The plug and socket assembly can include a frame having a racking portal on a front end portion thereof. The frame can be attached to the plug assembly and configured to move the plug assembly toward and away from the at least one pair of sockets.

At least the first pair of plugs can have a common outwardly extending length to concurrently engage a corresponding socket pair.

The device can be a molded case circuit breaker (MCCB). At least the first pair of plugs and the at least first pair of sockets include three sets or four sets of laterally spaced apart pairs, each pair for a different phase. The plug and socket pairs of each phase can engage concurrently.

The device can be a molded case circuit breaker (MCCB). The at least first pair of plugs and at least first pair of sockets can be a plurality of laterally spaced apart pairs, each pair for a different phase.

The first pair of plugs and the first pair of sockets can be associated with a center phase and can be sized and configured to engage first before other pairs of the plug and sockets to thereby reduce racking forces on initial plug and socket contact.

The plug and socket assemblies can be configured so that a load side of a corresponding plug and socket pair engages first and a line side second for three phases concurrently.

The device can be a disconnect. The at least first pair of plugs and the at least first pair of sockets can be configured as first, second and third pairs, the first, second and third pairs can be laterally spaced apart pairs, each pair for a different one of three phases comprising first, second and third phases. The plug and socket assemblies can be configured so that (i) a load side of corresponding plugs and sockets for each of the three phases engages first and a line side second and (ii) the socket and plug of the second (center) phase engage before sockets and plugs of the first and third phases.

Other embodiments are directed to units/buckets. The units include a device having a device body and electrical contacts; a plug assembly with at least one pair of line and load side plugs facing outward; a socket assembly with at least one pair of line and load side sockets aligned with the at least one pair of plugs and configured to releasably receive the at least one pair of plugs. The plug assembly is separate from the disconnect body, including when the at least one pair of plugs reside in a respective pair of the line and load side sockets. The units also include a racking mechanism with a frame having a racking portal attached to a threaded rod and a plurality or retractable stabs in communication with stab wires. The frame is attached to the plug assembly. In operation, a lever engages the threaded rod through a portal in the unit to retract the stabs from a bus and/or rack in and out the plug assembly.

The plug assembly can include an insulated support that separates the line and load side plugs. The frame of the racking mechanism can have a racking portal on a first (front) end portion and can hold the insulated support at a back end portion thereof. The threaded rod can have a short actuation isolation distance of between 0.5 inches and about 0.75 inches to isolate the stabs from a bus in communication with the unit.

The device can be a molded case circuit breaker (MCCB). The at least one pair of plugs and the at least one pair of sockets can both be a plurality of laterally spaced apart pairs of respective line and load side plugs and sockets, each pair for a different one of three or four phases. The plug assembly and the socket assembly can be aligned and configured so that a load side of a corresponding plug and socket pair engages first and a line side second (a) for all three phases concurrently or (b) for one phase first and at least one other phase sequentially thereafter.

The at least one pair of line and load side sockets is a plurality of laterally spaced apart pairs of line and load side sockets. The at least one pair of plugs can be a plurality of laterally spaced apart pairs. The plugs and sockets can all reside above the device body. The load side sockets can be electrically connected to contacts in a top portion of the device and can reside spaced apart above the device by between about 2-4 inches. The line side sockets are stationary and in electrical communication with a line side of a circuit of a respective unit.

The plug assembly can have an insulated support attached to a conductive bar holding the at least one pair of plugs. At least one plug of each of the at least one plug pair can reside above the insulated support and another at least one plug of the at least one plug pair can reside below the insulated support.

The at least one pair of plugs of the plug assembly can have parallel, adjacent, side-by-side line and load side plugs.

Still other embodiments are directed to a motor control center (MCC). The MCC includes a cabinet with a plurality of compartments, a power bus held by the cabinet; and a plurality of units held in a respective compartment of the cabinet. The units include a disconnect having a disconnect body and electrical contacts, a plug assembly with at least one pair of plugs facing outward, and a socket assembly with at least one pair of line and load side sockets aligned with the at least one pair of plugs and configured to releasably receive the at least one pair of plugs. The plug assembly is a separate component that is spaced apart from the disconnect body. The units also include a racking mechanism with a frame having a racking portal attached to a threaded rod and a plurality or retractable stabs in communication with stab wires. The frame can be attached to the plug assembly. In operation, a lever engages the threaded rod through a portal to retract the stabs from a bus in the MCC cabinet and rack in and out the plug assembly.

The plug assembly can include an insulated support that separates line and load side plugs. The frame can be attached to the insulated support. The bus can include a vertical bus. At least one of the disconnects is a molded case circuit breaker (MCCB). The MCC cabinet can include an isolator system in communication with the vertical bus with interlocks that reside electrically downstream of the MCCB. The interlocks can include physical components that are automatically released or engaged to lock a respective unit in position and can require that the MCCB be open prior to activation of the isolator system.

Still other embodiments are directed to electrical plug assemblies configured to cooperate with a socket assembly with electrical contacts. The plug assemblies include a laterally extending insulated support and a plurality of laterally spaced apart vertically oriented conductive bars held by the insulated support. The conductive bars have a length sufficient to extend above and below the insulated support. The plug assemblies also include a plurality of line side conductive plugs held by the conductive bars above the insulated support and a plurality of load side conductive plugs held by the conductive bars below the insulated support.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 1A is a partial front perspective view of a prior art drawout cassette (e.g., moving breaker frame) and stationary frame (e.g., stationary plug block) for a motor control center (MCC).

FIG. 1B is a bottom perspective view of the prior art drawout cassette shown in FIG. 1A.

FIG. 4A is a schematic side view illustration of an exemplary plug and socket isolator system for a bucket according to embodiments of the present invention.

FIG. 4B is a schematic side view illustration of an exemplary compact plug and socket isolator system for a bucket according to embodiments of the present invention.

FIG. 4C is an exemplary electrical schematic of a bucket having a plug and socket isolator system associated with the configurations shown in FIGS. 4A and 4B according to embodiments of the present invention.

FIG. 4D is an exemplary electrical schematic of a vertical bus isolator system according to embodiments of the present invention.

FIG. 6A is a schematic illustration of a motor control center housing with an exemplary unit or bucket withdrawn according to embodiments of the present invention.

FIG. 6B is a schematic illustration of the motor control center housing shown in FIG. 6A illustrating the plug and socket contacts engaged in the housing, with the plug and socket arranged to have a stepped and/or sequenced contact engagement according to embodiments of the present invention.

FIG. 6C is an enlarged side view of the plug and socket configuration shown in FIGS. 6A and 6B.

FIG. 7A is a front, side perspective view of exemplary plug assembly aligned with exemplary and sockets according to embodiments of the present invention.

FIG. 7B is a front, side perspective view of an exemplary load side socket arrangement according to embodiments of the present invention.

FIG. 9D is a rear view of another exemplary plug sub-assembly according to embodiments of the present invention.

FIG. 9E is a top view of the sub-assembly shown in FIG. 9D.

FIG. 9F is a side view of the sub-assembly shown in FIG. 9D.

FIG. 11B is a side, top perspective and partially exploded view of the racking mechanism shown in FIG. 11A according to embodiments of the present invention.

DETAILED DESCRIPTION OF EMBODIMENTS OF THE INVENTION

Figure 2:
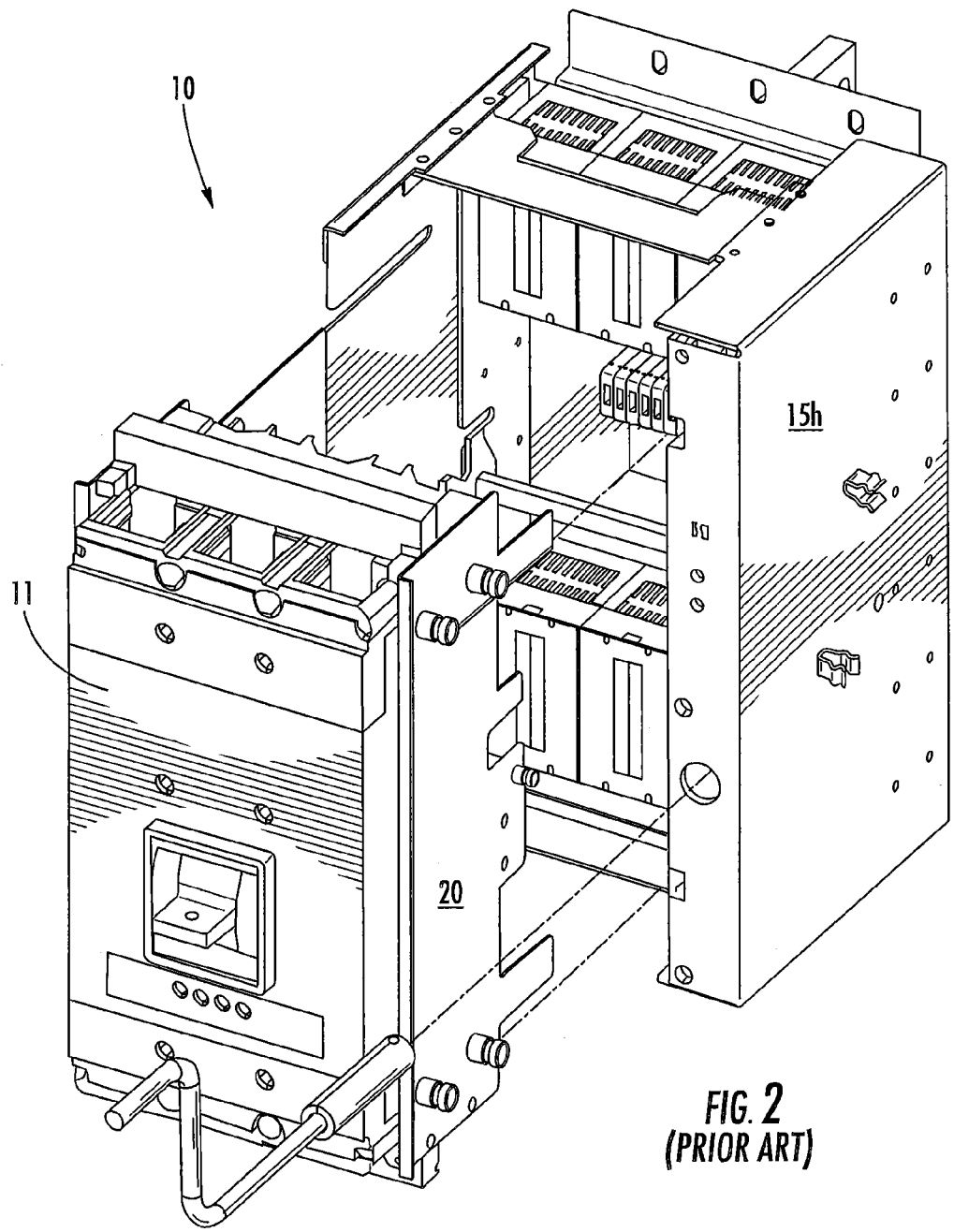
FIG. 2 is a front partial exploded view of prior drawout accessory with a crank lever for a racking mechanism to move a breaker between connected and disconnected positions.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

Figure 3B:
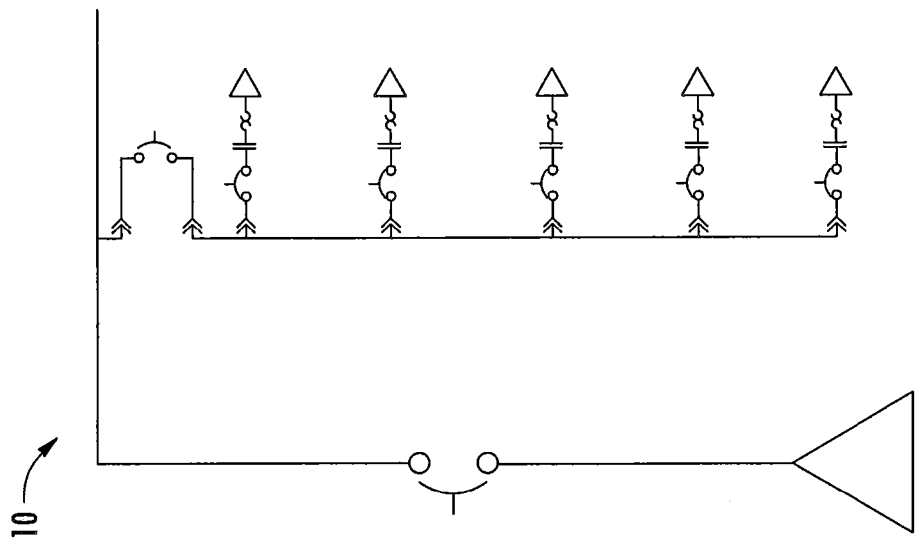
FIG. 3B is an electrical schematic of a bucket having the arrangement shown in FIG. 3A.
Figure 3A:
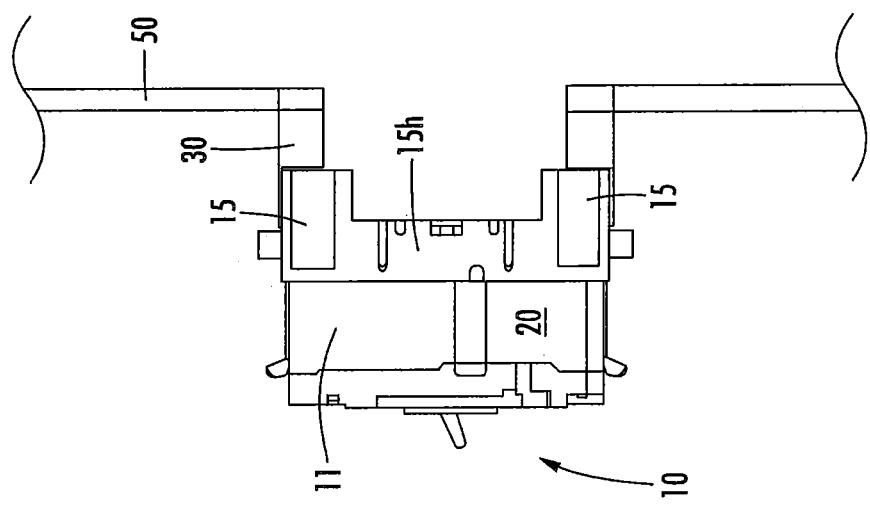
FIG. 3A is a schematic illustration of a prior art drawout/plug-in arrangement configured as a vertical bus isolator of some breaker frames.
Figure 5C:
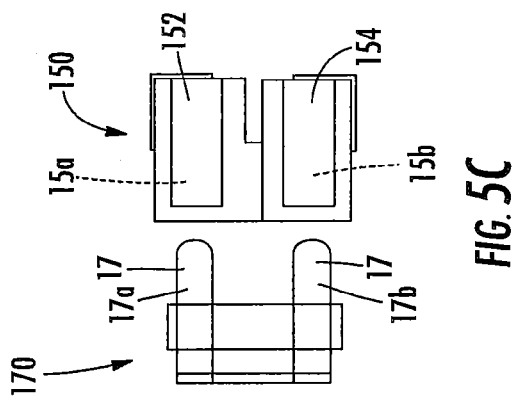
FIG. 5C is an enlarged side view of the plug and socket configuration shown in FIG. 5B.

As discussed before, units may be configured as "starter units" for supplying power controlling electrical motors and pumps or as general "feeder units" for supplying feeder circuits. The terms "bucket assembly", bucket" and "unit" are used interchangeably and refer to a structure (typically having sides of a protective metal shell) that contains either a switch with a fuse or a circuit breaker for turning power ON and OFF to a motor, or feeder circuit, typically for controlling power to motor starters. As noted above, the bucket or unit can be a feeder unit or a starter unit. The bucket can include other components such as a power transformer, a motor starter to control a single motor and PLCs (programmable logic controllers), drives and the like. The bucket can be configured as a modular device to allow the internal components to be assembled as a unit that can be easily installed into a Motor Control Center (MCC) compartment. As is well known, the bucket 10 can connect to bus bars that carry power (current) to the compartments of a vertical section in an MCC cabinet 100 (FIG. 5A). The bus bars can comprise vertical bus bars 50 (FIG. 3A, 4A, 5A) that can be connected to larger horizontal bus bars that bring power to the vertical sections. The horizontal bus bars are usually in the top, but some MCC designs may have them in the center or bottom.

A "feeder unit" refers to a motor control center unit for supplying feeder circuits. A feeder unit may have one or more feeders or power supply lines to supply feeder circuits or devices. A feeder unit (also called a "feeder") can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration. The terms "feeder circuit" and "feeder device" are used interchangeably and are intended to mean circuits or devices connected to feeder units or "feeders".

A "circuit breaker", "breaker", "molded case circuit breaker", or "MCCB" is a device designed to open and close a circuit, typically allowing both manual open and close operation and automatic circuit interruption, the latter to open a circuit under certain conditions, e.g., an over-current. The circuit breaker can be for a motor starter unit or feeder unit, for example. Molded case circuit breakers are well known to those of skill in the art, as exemplified by U.S. Pat. Nos. 4,503,408 and 5,910,760, the contents of which are incorporated herein by reference as if recited in full herein The terms "motor", "load", and "load device" are used interchangeably and are intended to mean devices bearing electrical load that are connected to and controlled by the motor control center. Load devices are typically motors but may also be pumps or other machinery that may comprise motors or pumps. Load devices may be connected to starter units.

The terms "operating mechanism" and "operator mechanism" are used interchangeably and refer to an assembly for opening and closing separable main contacts in a circuit breaker or for turning power ON and OFF using a disconnect switch associated with a fuse as a disconnect.

MCCs usually have a wire way for wires from respective units 10 to the motors and other loads and control wires. U.S. Patent Application Publication 2013/0077210 describes an MCC with both right and left side wireways, the contents of which are hereby incorporated by reference as if recited in full herein. The wireways are typically provided as an enclosed space in an MCC cabinet proximate but outside stacked units. MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company. A typical MCC cabinet is an enclosure with a number of small doors arranged in rows and columns along the front. The back and sides are typically flat and mostly featureless. The buckets can be provided in varying sizes. For starter units, the size can be based on the size of the motor they are controlling. The bucket assembly can be configured to be relatively easily removable for repair, service or replacement. MCCs can have regular starters, reversing starters, soft start, and variable frequency drives. MCCs can be configured so that sections can be added for expansion if needed. The buckets or units 10 of a motor control center 100 (FIG. 5A) can have the same or different configurations.

Figure 15:
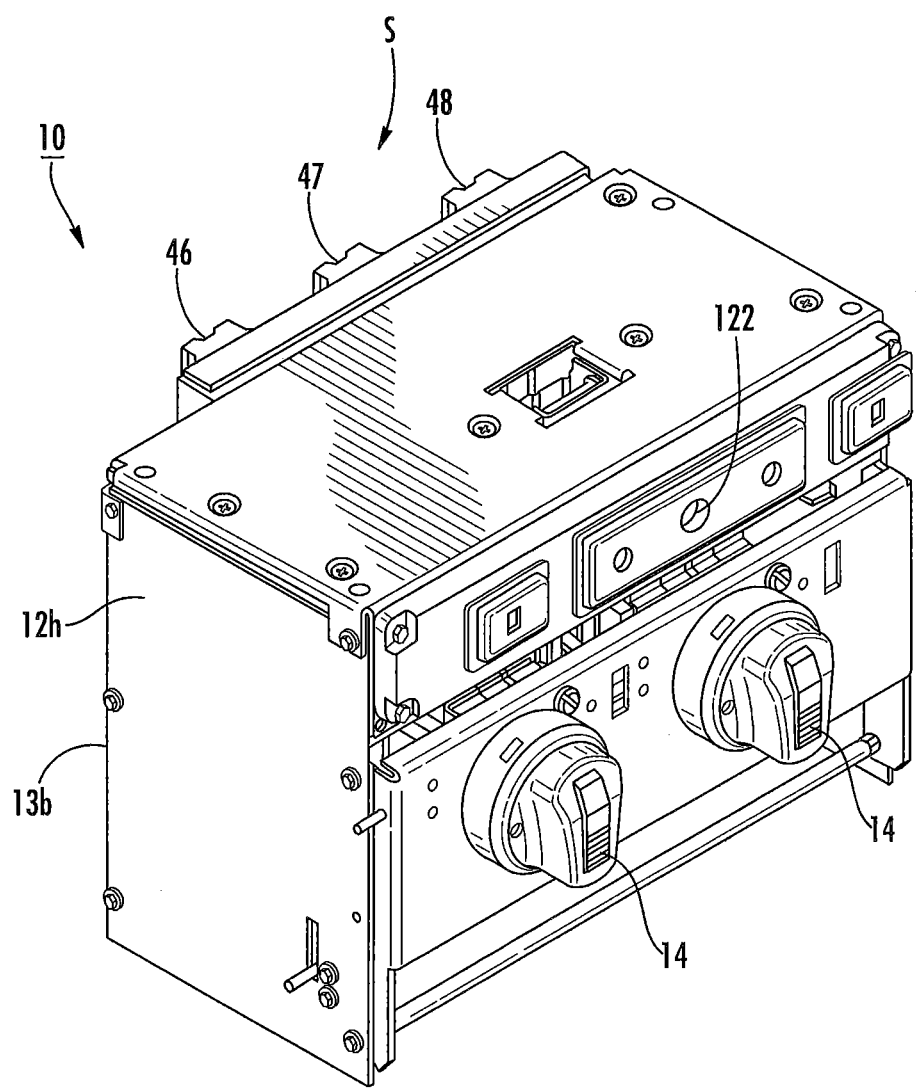
FIG. 15 is an assembled view of an exemplary unit with the racking mechanism that can incorporate the new plug and socket configurations shown in one or more of FIGS. 4A, 4B and 5A according to embodiments of the present invention.

The terms "right side" and "left side" refer when the unit or MCC is viewed from the front, e.g., the front is associated with the unit 10 orientation shown in FIG. 15, for example, with handles 14 facing forward. While the handles 14 are shown as rotary handles, other handle configurations may be used, including, for example, push handles, levers and linearly moveable handles. It is also noted that where dual feed configurations are used, they can be provided with operating handles in a side-by-side arrangement as shown in FIG. 15, but it is contemplated that vertically aligned handles may also or alternatively be used with the respective disconnects placed in the unit accordingly. The unit 10 can be configured for DC (direct current) or AC (alternating current) operation. The unit 10 can include a front cover over a door or panel holding the handle 14. The unit 10 can have a metal enclosure, frame or housing 12h with sidewalls 13 and a back 13b (FIG. 15).

The term "compact" when used with respect to a "compact unit" 10, refers to units 10 held in a condensed configuration (package) relative to conventional units/buckets. The MCC cabinet 100 (FIG. 5A, 6A) can be designed with compartments 102 to receive multiple bucket units 10 ranging in various defined sizes. The units 10 can be provided in package or frame sizes of about 6 inches to about 72 inches (tall) with substantially common depth and width dimensions, known as 1X (6 inches) to 12X (72 inches) sizes. The sizes can be in single X increments, from 1X, 2X, 3X, 4X, 5X, 6X, 7X, 8X, 9X, 10X, 11X and 12X.

Thus, a 5X MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example. A unit 10 is typically about 7 inches deep but larger or smaller sizes may be appropriate in some embodiments.

Referring now to FIGS. 4A and 4B, a unit 10 can include a device 11 with electrical contacts 11c. The device 10 can be a disconnect 11 such as a breaker or disconnect switch with a fuse, shown as a breaker. The unit 10 can also include a plug assembly 170 and a socket assembly 150. The plug assembly 170 can be spaced apart from the disconnect 11 in contrast to the conventional configuration shown in FIGS. 3A and 3B, for example.

While the plug and socket assemblies 170, 150 may be particularly suitable for connecting a unit with a disconnect 11, they may alternatively be used for units with other devices for powering, e.g., controllers and/or motor starters and the like.

As shown in FIGS. 4A and 4B, in some embodiments, the plug assembly 170 can reside above the disconnect 11 with a separation distance of between about two (2) inches and about four (4) inches, as shown. This spacing may be sufficient to allow for reliable electrical connection to a (copper) bus bar or hardwiring. Similarly, the socket assembly 150 can reside above the disconnect 11, e.g., breaker, with respective sockets 15 aligned with corresponding plugs 17 for electrical contacts of the circuit.

The plug assembly 170 can include plugs 17 that extend inward to face the corresponding sockets 15. An electrically insulated support 175, which can also interchangeably be referred to as a "shorting bar" or "support member", can extend between line and load side plugs 17a, 17b. The load side plugs 17 can be below the line side plugs 17, but other orientations may be used. One or more the load and line side plugs 17 of a respective pair 17p, can be spaced apart between about 2 inches to about 4 inches, measured between axially extending centerlines thereof.

FIG. 4A illustrate the pairs of load and line side plugs 17 spaced (vertically) apart a first distance that is greater than the separation distance shown in the embodiment of FIG. 4B. FIG. 4C is an exemplary electrical schematic of a bucket 10 having a plug and socket isolator system 10i associated with the configurations shown in FIGS. 4A and 4B according to embodiments of the present invention.

FIG. 4D is an exemplary electrical schematic of a vertical bus isolator system 100i for an MCC cabinet 100 using the plug and socket assemblies 170, 170' and 150, 150', described herein according to embodiments of the present invention.

In some embodiments, the physical separation of the plugs 17 away from the body of the disconnect 11 allows a compact, relatively close positioning of the line and load side plugs 17a, 17b as shown in FIG. 4B. This close spacing "D" between axially extending centerlines of adjacent upper and lower plugs 17a, 17b, can be between 2-4 inches. The close spacing "D" can vary but is typically based on electrical clearance spacing defined by NEC code of socket placements such as 1 inch through air or 2 inches of insulation (also known as creepage distance) or over the surface.

The socket assembly 150 can have some sockets 15 that are electrically directly connected to the disconnect 11 via suitable gauge wires, cables or via a conductive (e.g., copper) bus 130. The electrical connection 130 can be routed from the top of the disconnect 11t, shown as the top of a MCCB, to the bottom side of the socket assembly 150b for laterally spaced apart sockets 15 residing on the lower side 150*b* of the socket assembly 150. The socket assembly 150 can include laterally spaced apart sockets 15*a* shown as residing above the lower side sockets that can be connected to the bus 50.

In some embodiments, the compact plug assembly 170 can be incorporated into a racking mechanism 200 (FIGS. 11A, 11B) as will be discussed further below.

Figure 5B:
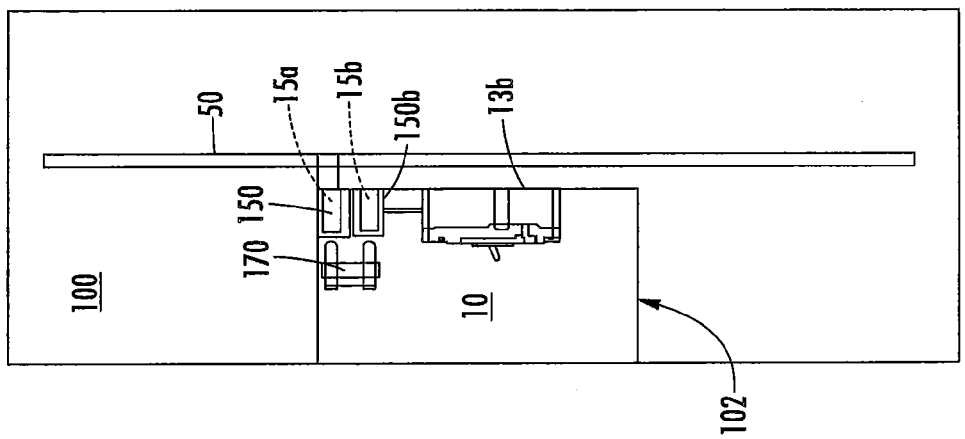
FIG. 5B is a schematic illustration of the motor control center housing shown in FIG. 5A illustrating the plug and socket contacts engaged in the housing according to embodiments of the present invention.
Figure 5A:
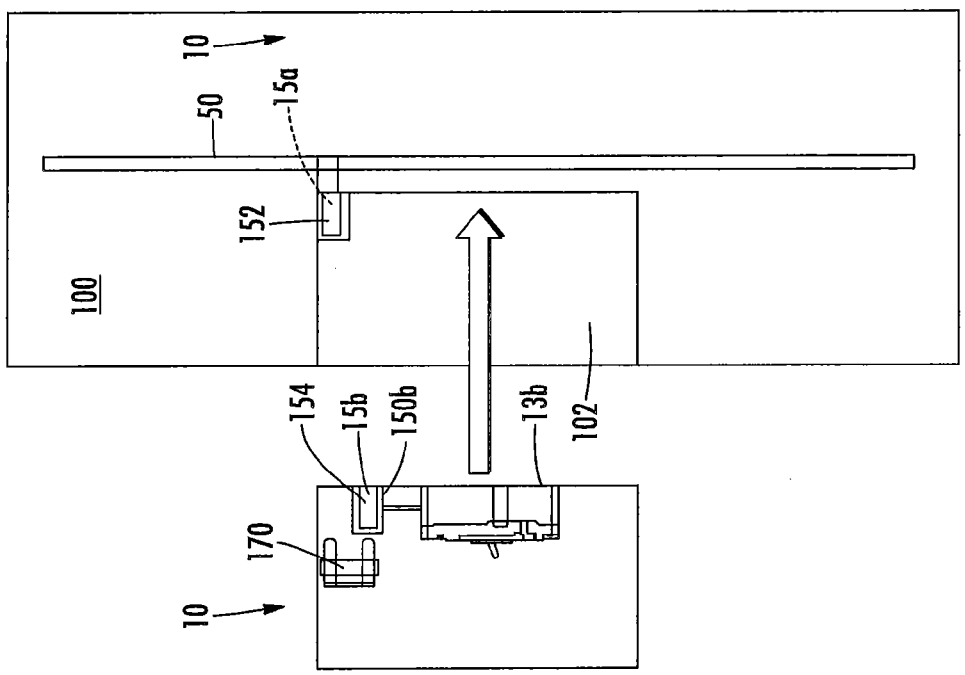
FIG. 5A is a schematic illustration of a motor control center housing with an exemplary unit or bucket withdrawn according to embodiments of the present invention.

FIGS. 5A and 5B illustrate an exemplary MCC housing or cabinet 100 with at least one unit 10, typically a plurality of modular units 10. One or more of the units 10 can have a plug assembly 170 that resides above or below the disconnect 11. The plug assembly 170 can reside on a frame 180 connected to a racking mechanism 200 so that the plug assembly 170 can move as the racking mechanism racks the disconnect 11 in or out of the unit 10 and/or cabinet 100.

Referring to FIGS. 4A, 4B, 5A and 6A, the upper (typically line side) sockets 15*a* can be provided as a series of upper sockets in a housing or housings 152 of the socket assembly 150. The upper series of sockets 15*a* can be stationary and can directly electrically connect to the bus 50. The housing(s) with sockets 152 is typically stationary/fixed in place and rigidly bolted to the bus 50. As shown, load side sockets 15*b* can reside under the line side sockets 15*a*.

FIGS. 5A and 5B and 6A and 6B illustrate the load side and/or lower sockets 15*b* can be in a separate case or housing(s) 154. In some embodiments, the lower housing 154 can be assembled into the unit compartment 102 pre-attached to the disconnect 11. The lower socket housing 154 with the lower sockets 15*b* can move in and out of the compartment 102 while attached to the disconnect 11 as part of the unit 10. The unit 10 can be manually inserted into the compartment 102. The unit can be secured with a unit interlock. With the unit door closed, the plugs 17 can be racked in using a speed wrench inserted through portal 122 (FIG. 11B) to engage the head 202*h* of the actuator 200 to rack in/out the unit 10.

FIG. 5C illustrates that the plugs 17 can be in-line (have the same outward distance) and configured to engage all phases (e.g., three phases) concurrently. FIG. 6C illustrates that the plugs 17 can be configured to define a stepped or sequenced contact engagement. One or more of the plugs 17 of the upper plugs 17*a* can be held by the support 175 and/or frame 80 (FIG. 7A) to be laterally in-line at a common vertical position as can the lower plugs 15*b*. However, one or more of the upper plugs 17*a* can have a different outwardly extending length than one or more of the lower plugs 17*b* to allow for a stepped and/or sequenced contact engagement of corresponding plug and socket pairs. The different length can be between 0.1 inch and 1 inch. As shown, one or more of the upper plugs 17 has a shorter length than one or more of the plugs 17 of the bottom set of plugs 17*b*. In some embodiments, contacts 17 are configured to engage a load side (shown by way of example as the bottom side) first, and a line side second for all three phases. In some embodiments, the plug contacts 17 engage the load side first, the line side second and phase A, B and C can be sequenced so that the center or "B" phase engages first, then A and C phases engage either stepped or sequentially or concurrently. Having the center phase "B" engage first can reduce the racking forces on initial plug to socket contact.

FIG. 7A illustrates the plug assembly 170 aligned with a unit socket assembly 150. The plug assembly 170 can include a frame 180 that holds a racking portal 22 on a front end portion thereof. The frame 180 can hold the plug assembly 170, typically attached to the laterally extending insulated support 175. The frame 180 can cooperate with or be part of a racking mechanism 200 (FIG. 11A, 11B) so as to be able to move the plug assembly 170 in and out in response to rack-in and rack-out actions.

FIG. 7B illustrates that the load side sockets 15*b* can each be permanently hard-wired W to the disconnect 11. As shown, the contacts 11*c* on the top of the breaker 11*t* can be hardwired to the load side sockets 15*b* using non-flexible, standard wiring practices. The disconnect 11 and load side socket housing(s) 154 can be mounted to steel back panel 13*b* of the unit 10 and an insulator (not shown). can be held between the steel back panel 13*b* and sockets 15 for a suitable insulation barrier.

The sockets 15*b* can be attached to a bus connection 144, e.g., a copper bus, as shown in FIGS. 7A and 7B.

Figure 8A:
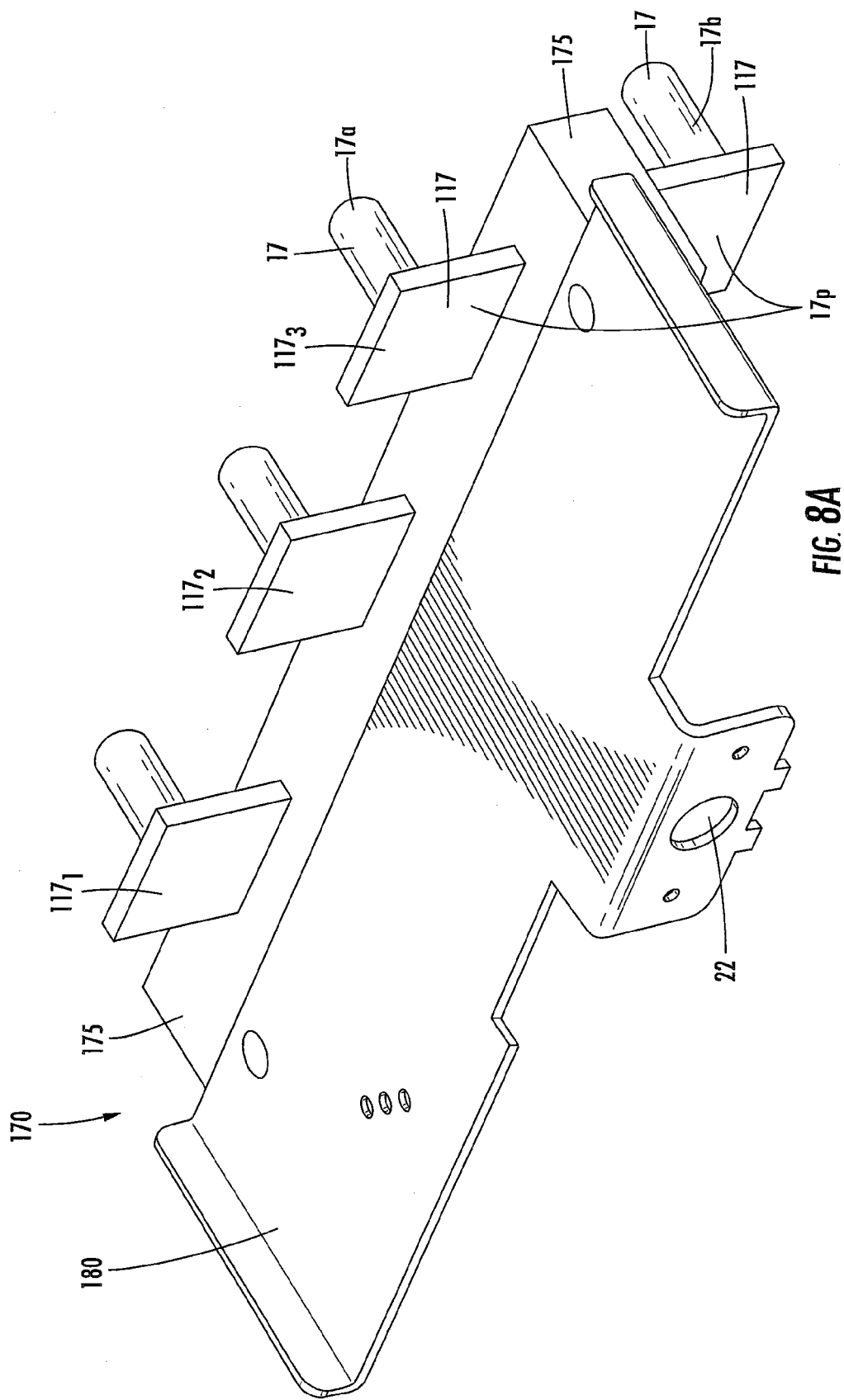
FIG. 8A is an enlarged front, side perspective view of an exemplary plug assembly according to embodiments of the present invention.

FIG. 8A is an enlarged view of a plug assembly 170 illustrating the support 175 can be held by the frame 180 that has the racking portal 22. The insulated support 175 can hold conductive (e.g., copper) bars 117, each with a pair of plugs 17 per phase, shown as three conductive bars $117_1$, $117_2$, $117_3$ for three phases, each conductive bar 117 holding vertically aligned pairs 17*p* of respective upper and lower plugs 17*a*, 17*b*, for two plugs per phase.

Figure 8B:
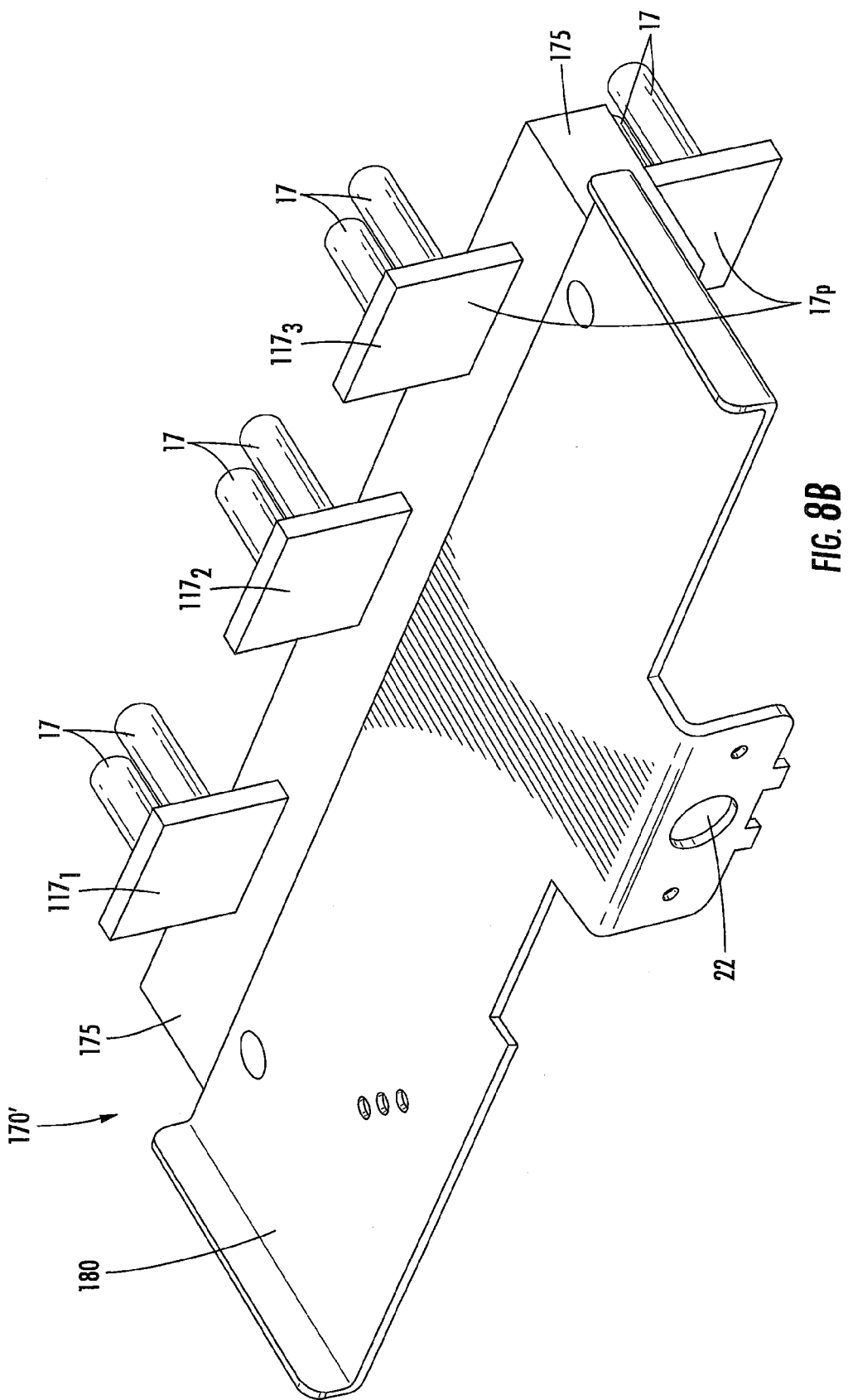
FIG. 8B is an enlarged front, side perspective view of another exemplary plug assembly according to embodiments of the present invention.

FIG. 8B illustrates that the plug assembly 170' can be provided with plugs 17 in a double break configuration 17*d*, e.g., a pair of two adjacent, parallel plugs 17 for a load side and two adjacent, parallel plugs for a line side per pole/phase, the line side pair for each pole can reside above the load side pair in some embodiments.

Figure 9C:
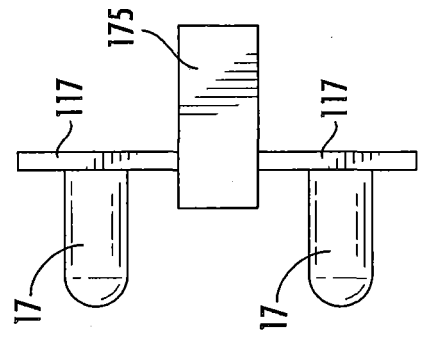
FIG. 9C is a side view of the sub-assembly shown in FIG. 9A.
Figure 9A:
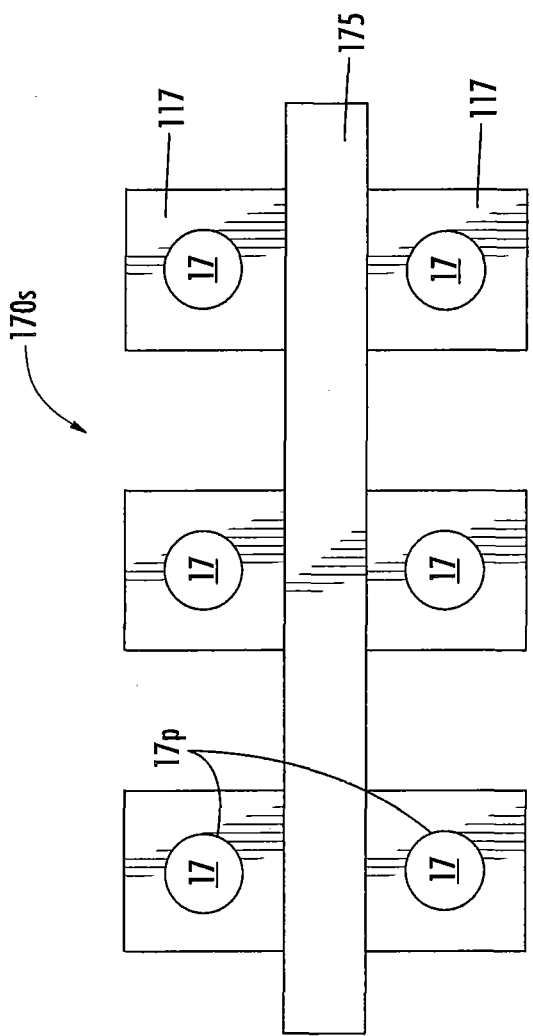
FIG. 9A is a rear view of an exemplary plug sub-assembly according to embodiments of the present invention.
Figure 9B:
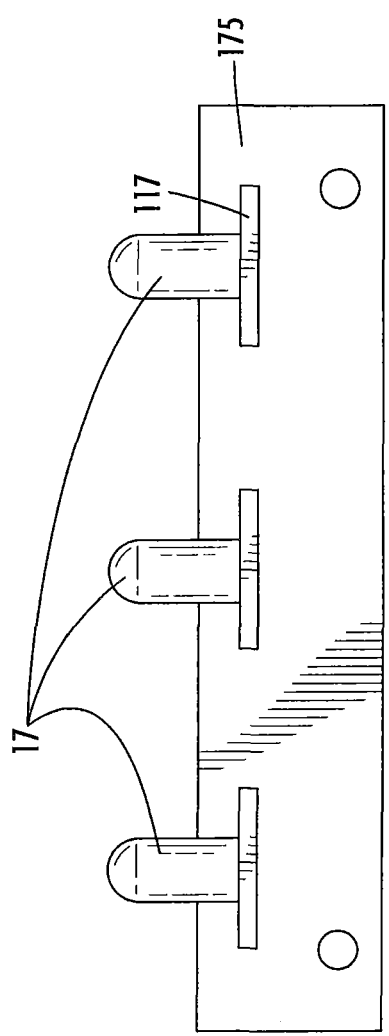
FIG. 9B is a top view of the sub-assembly shown in FIG. 9A.

FIG. 9A is a back view of an exemplary plug sub-assembly 170*s* with a plurality of conductive bars 117 holding respective pairs 17*p* of plugs 17 with an insulated support 175. The insulated support 175 can be oriented to reside horizontally and may be centered to extend across medial locations of the conductive bars 117. FIGS. 9B and 9C show that the conductive bars 117 can be held closer to the back of the bar 175 than the front and that the plugs 17 can extend a distance rearward of the insulated support 175. FIGS. 9D-9F illustrate the plug sub-assembly with parallel, side-by-side, adjacent plugs 17 for at least one socket pairs 17*p*.

Figure 10:
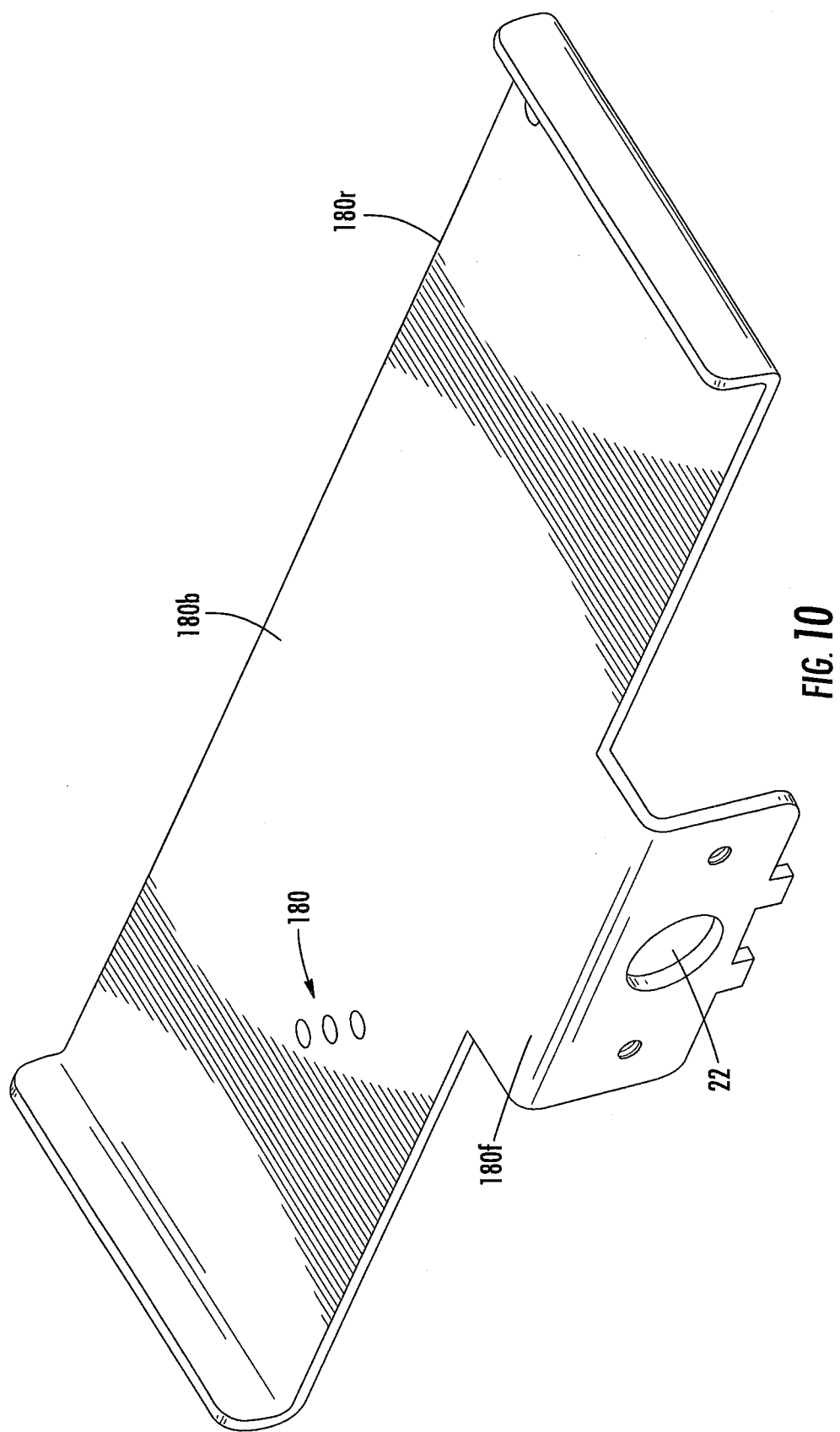
FIG. 10 is a top perspective view of a racking mechanism frame with a portal that can hold the plug sub-assembly shown in FIG. 9A or 9D, according to embodiments of the present invention.

FIG. 10 illustrates an example of a frame 180 suitable for holding the plug assembly 170. The frame 180 a downwardly extending front portion 180*f* with the racking portal 22. The frame 180 can be a monolithic body with a formed, bent segment holding the portal 22. In other embodiments, separate attached components may be used. The frame 180 can have a primary body segment 180*b* that is flat with a continuous flat back edge 180*r*. A back portion of the frame 180 can attach to insulated support 175 of the plug sub-assembly 170.

In other embodiments, the plug assembly can be indirectly attached to the racking mechanism 200 using a different mounting configuration. In some embodiments, the plug assembly 170 is not required to be used with units configured with a racking mechanism 200.

Figure 11A:
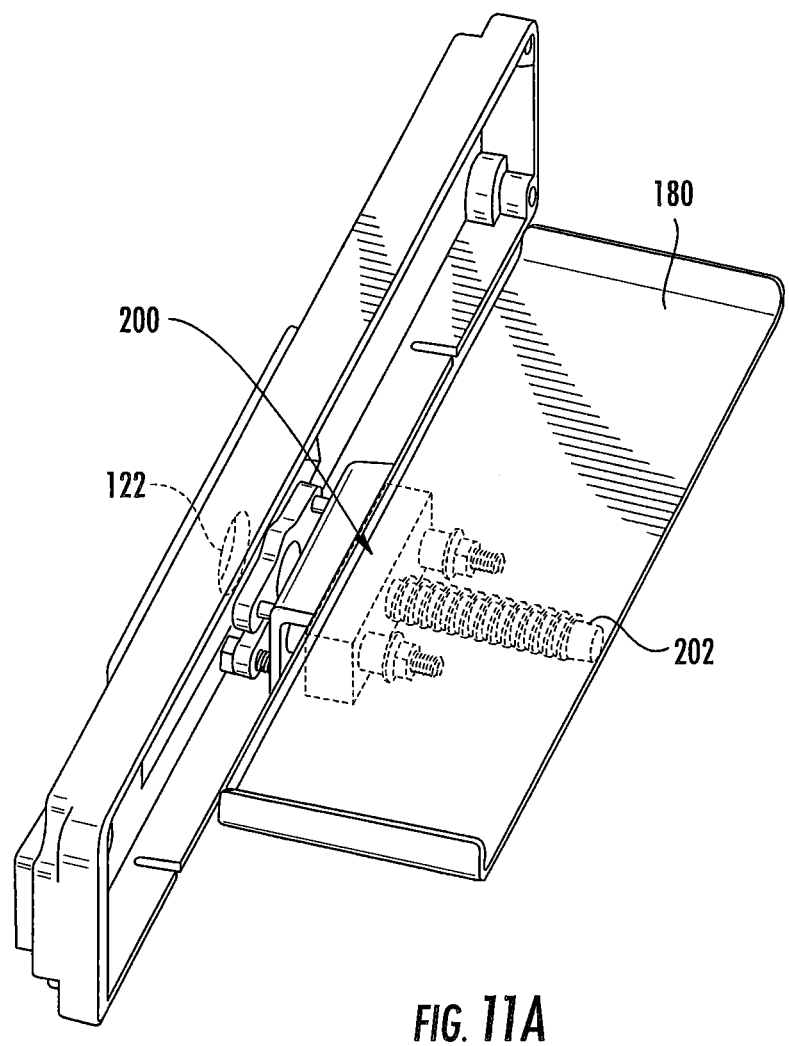
FIG. 11A is a top, side perspective view of a racking mechanism with the frame shown in FIG. 10 according to embodiments of the present invention.

FIGS. 11A and 11B illustrate an example of a racking mechanism 200. The racking mechanism 200 can reside above the disconnect(s) 11 and can include a screw actuator 202. In use, a crank lever 22*l* (FIG. 2) can engage the head 202 of the screw 202 (e.g. threaded rod) to turn the screw 202 and move the frame 180 inward (in one direction) and outward (in an opposing direction) for rack-in/rack-out. Conventionally, twenty-two (22) turns of the screw 202 and a distance of between about 1.75-2 inches have been used. The new design allows a more compact stroke. Thus, in some embodiments, the stroke of the screw 202 for racking can be relatively short such as under 15 turns, such as about eleven (11) turns for a suitable isolation distance of about 0.75 inches to about 1 inch. Exemplary racking and/or flash guard configurations are described in one or more of U.S. Pat. Nos. 7,688,572; 7,684,199; and 8,817,454, the contents of which are hereby incorporated by reference as if recited in full herein.

Access to the racking tool portal 122 which is aligned with the frame portal 22 can be interlocked to be open only when the disconnect (e.g., breaker) 11 is open through the operator mechanism handle 14 (FIG. 15).

In a de-energized state of the MCC 100, the user-operator may operate an isolation feature by inserting a crank 22*l* (FIG. 2) through the access portals 122, 22 to access the screw 202 as the line contact actuator of the racking mechanism 200 to thereby move plugs 170*a*, 170*b* away from the line contacts 15*a*, 15*b*.

In some embodiments, the racking mechanism 200 can also move stab contacts S or 46, 47, 48 (FIGS. 12, 15) to an isolated position out of electrical contact with power lines or buses 50 of the motor control center 100.

Figure 16:
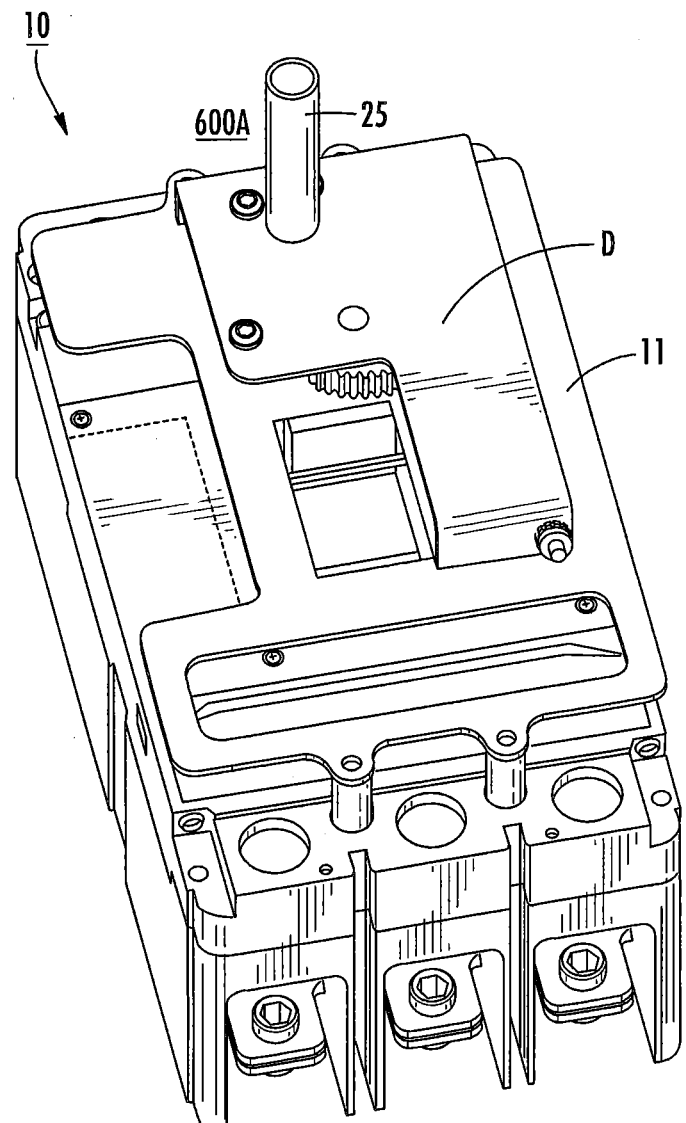
FIG. 16 is a top perspective view of an exemplary 600 A disconnect with an operating mechanism that can be used with the new plug and socket isolators according to embodiments of the present invention.

FIGS. 11A, 11B, 12 and 15 illustrate that the unit 10 can have a stab isolating portal 122 that can reside above the handle(s) 14 in-line with the frame portal 22. The stabs 46, 47, 48 can be retractable stabs. The operator handle 14 can be attached to an inwardly extending shaft 25 (e.g., FIG. 16). The shaft 25 can hold an interlock linkage and at least one cam. The shaft 25 can communicate with a gear (part of which is shown in FIG. 16) and can be part of the operator disconnect mechanism D (FIG. 16, for example). The cam can be configured to move the at least one shutter both right to left and left to right so that the shutter blocks access to the portal 122 when in the ON position. See, e.g., co-pending U.S. patent application Ser. No. 14/318,971, the contents of which are hereby incorporated by reference as if recited in full herein.

The term "ON" with respect to handle position/orientation refers to the associated feeder or starter of the unit 10 having conduction with the operator disconnect closed (circuit breaker closed or fused switch being ON/switch closed). The term "OFF" with respect to handle position/orientation refers to the associated feeder or starter of the unit 10 having no conduction with the disconnect open (circuit breaker open or disconnect switch OFF/switch open).

Figure 12:
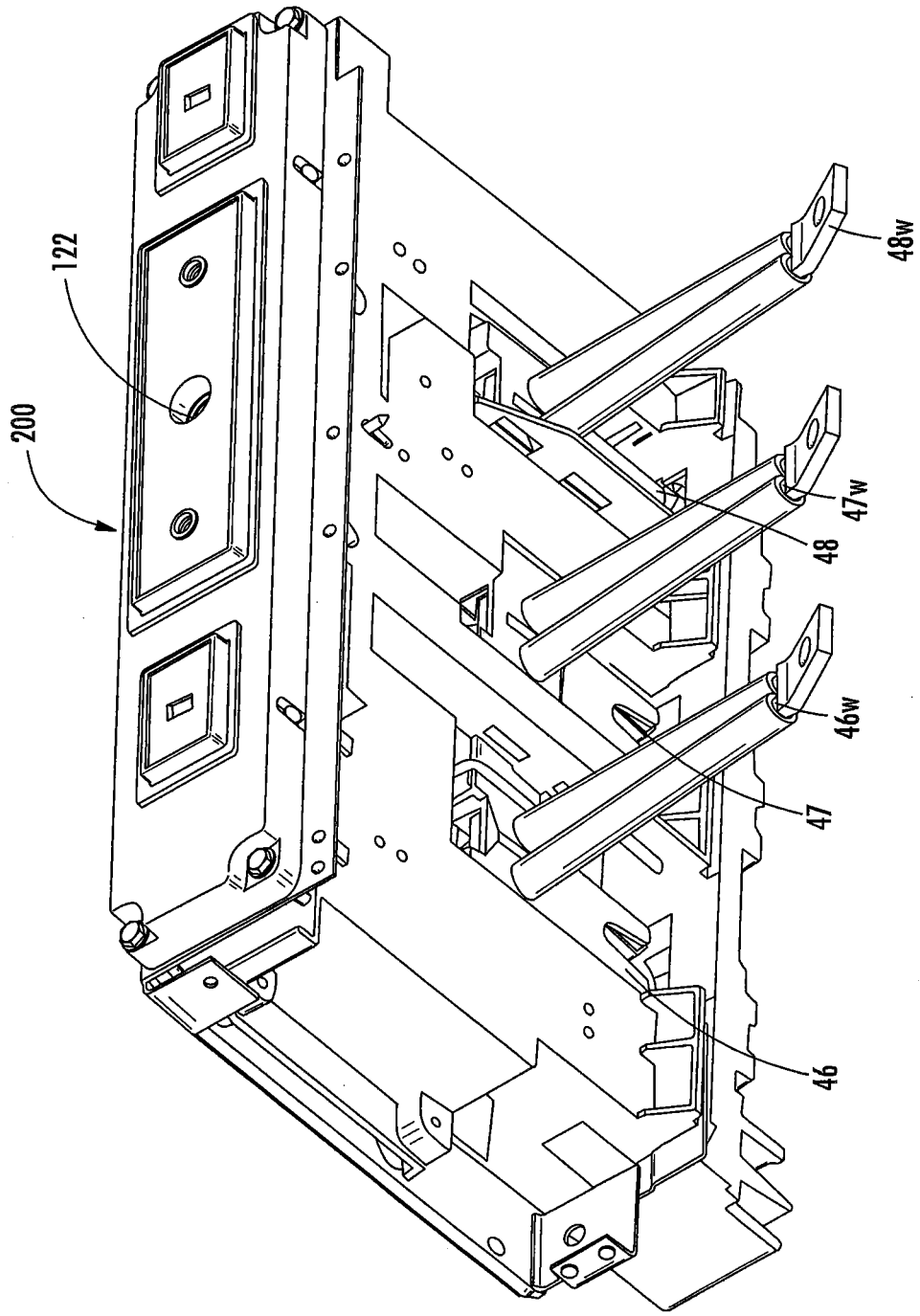
FIG. 12 is a bottom perspective view of an exemplary flash guard assembly with the racking mechanism shown in FIG. 11A according to embodiments of the present invention.

FIG. 12 illustrates a racking mechanism 200 with the stabs 46, 47, 48 at the back of the unit 10 that can be moved inward to retract the stabs. The stabs are connected to downwardly extending stab wires 46*w*, 47*w*, 48*w*, respectively. The racking mechanism 200 can move stabs 46, 47, 48 and disengage wires 46*w*, 47*w*, 48*w* so as to have a suitable isolation distance away from the bus, typically about 1 to about 3 inches. As noted above, the racking mechanism 200 can also rack in and out the plug assembly 170.

In some compact stab isolator systems, the compact plug assembly 170 can operate with shorter isolation distances of between about 0.5-1.0 inches, e.g., about 0.5 inches, about 0.75 inches and about 1 inch, for example. A short isolation distance of about 0.5 inch can be used for double breaks 17*d* (FIG. 9A, 9D, for example). Each plug/socket for a phase can have a 0.5 inch spacing, e.g., two times 0.5 inches can be used. The plug and socket assemblies 170, 150 can be particularly suitable for 150 A, 250 A, 400 A, 600 A & 1200 A products.

Figure 13:
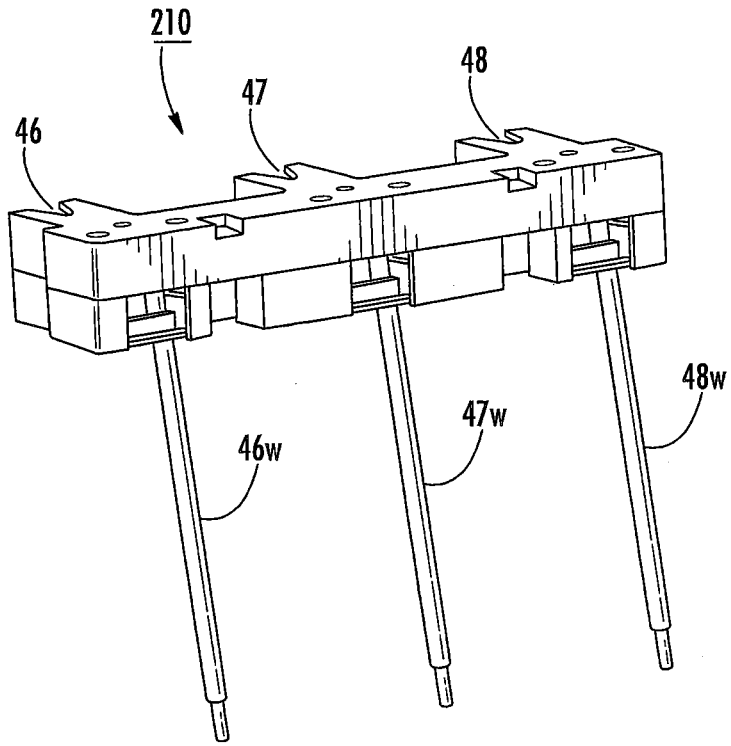
FIGS. 13 and 14 are front perspective views of stab sub-assemblies for a flash guard assembly according to embodiments of the present invention.
Figure 14:
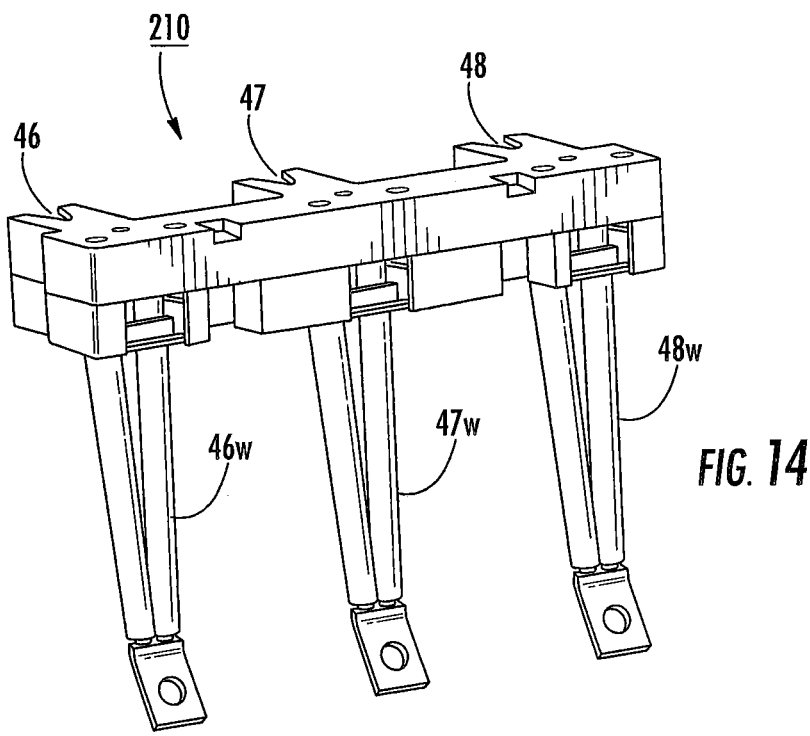

FIGS. 13 and 14 illustrate exemplary flash guard stab sub-assemblies 210 that can be held by a unit 10 with a racking mechanism 200 and/or the plug assembly 170. Different size and/or numbers of wires can be used for different amperage units (e.g., #4 AWG for 150 A, two #4 AWG for a 250 A and two #2 AWG for a 400 A breaker, for example). FIG. 13 illustrates stab wires with ends that can be hard-wired to line side wires. FIG. 14 illustrates a screw-on connector that can be connected to a line side of a breaker or K switch.

Embodiments of the invention can configure the plug assembly 170 and/or socket 150 as a modular single phase cassette arrangement, e.g., one cassette 150*h* (a "cassette" refers to the enclosure and/or housing) for one or more sockets per phase or a multiple phase cassette configuration, such as a three phase cassette configuration or a four pole configuration, e.g., sockets 15 for each of three or four poles/phases in a single cassette, each aligned with a plug for connection to the vertical bus 50. Combinations of multiple phase cassettes or single phase cassettes for either the sockets 15 may also be used.

Figure 18B:
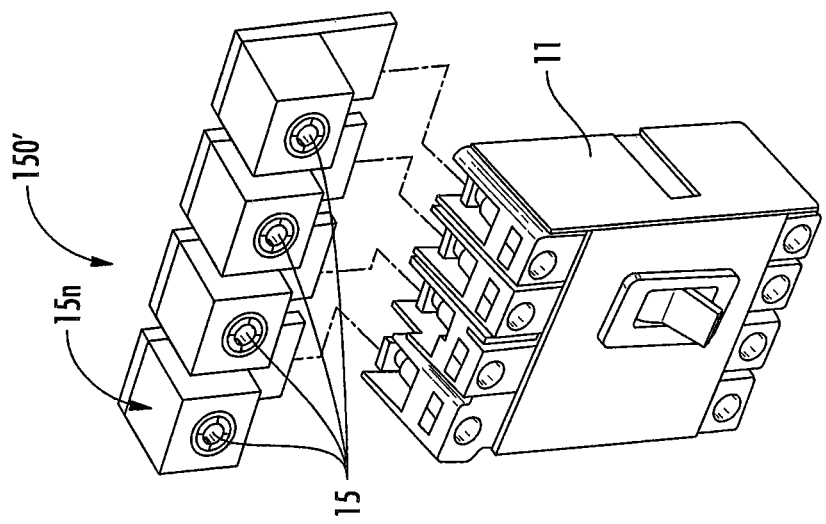
FIGS. 18A and 18B are front perspective views of a four pole configuration for the socket and plugs according to embodiments of the present invention.
Figure 18A:
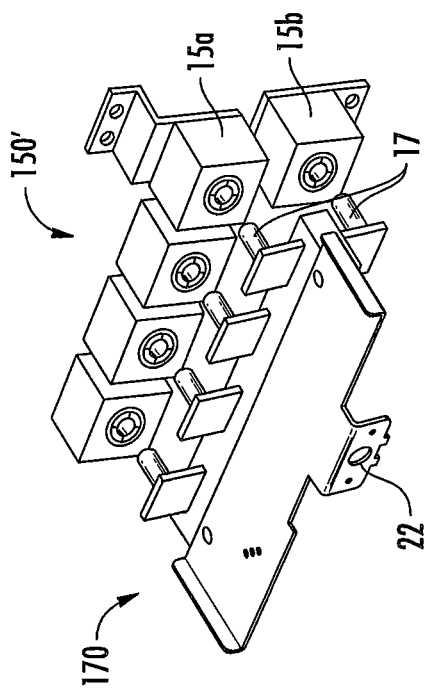

In some embodiments, the plug assembly 170 and socket assembly 150 can include a $4^{th}$ pole option as shown in FIGS. 18A and 18B, which may be suitable for a global market opportunity. A neutral pole socket 15*n* can be arranged on one side, shown as on the left side in FIG. 18B.

Figure 17:
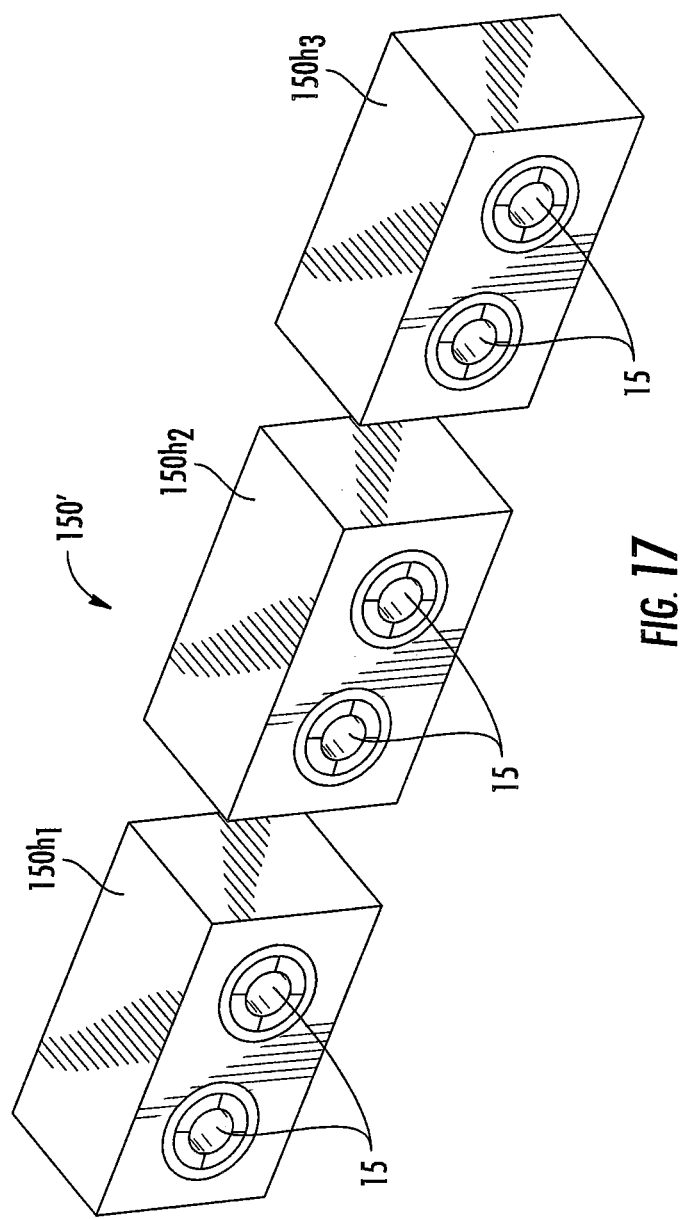
FIG. 17 is a front perspective view of modular cassettes with parallel sockets according to embodiments of the present invention.

In some embodiments, as shown in FIG. 17, for example, the socket assembly 150' can be provided as modular two socket per phase cassettes 150$h_1$, 150$h_2$, 150$h_3$ for alignment with the double break plugs 17 shown in FIGS. 8B and 9D-9F. This configuration may be particularly suitable as a 600 A per phase for a 1200 A option as a NG breaker arrangement.

The unit 10 can be configured with an interlock that ensures that the unit disconnect D (e.g., breaker) is OPEN before allowing the unit stabs S to be racked in or out, and when the disconnect D (breaker) is closed, the interlock is configured so that the stabs S must remain closed. The racking system can be configured as a slow break contact arrangement and is not typically designed to breaker the electrical current.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A plug and socket assembly for a unit, comprising:
   a device having a disconnect body and electrical contacts;
   a plug assembly with at least a first pair of line and load side plugs facing outward from an insulated support; and
   a socket assembly with at least a first pair of line and load side sockets aligned with the first pair of plugs and configured to releasably receive the first pair of plugs, wherein the plug assembly is separate from the disconnect body including when the first pair of plugs reside in the first pair of the line and load side sockets.

2. The plug and socket assembly of claim 1, wherein the plug assembly also comprises second and third pairs of laterally spaced apart line and load side plugs held on the insulated support on conductive bars, each of the second and third pairs of plugs having at least one plug extending above and at least one plug extending below the insulated support.

3. The plug and socket assembly of claim 2, wherein the line and load side plugs of each of the first, second and third pairs of plugs have a vertical separation distance of between about 2 and about 4 inches.

4. The plug and socket assembly of claim 1, wherein the first pair of plugs includes parallel, adjacent first and second line-side plugs held by the insulated support residing above first and second parallel, adjacent load-side plugs held by the insulated support.

5. The plug and socket assembly of claim 1, wherein the socket assembly comprises a line side set of sockets fixedly attached to a bus of an MCC cabinet and a load side set of sockets electrically connected to but spaced apart above a top of the disconnect body.

6. The plug and socket assembly of claim 5, wherein the line side and load side sets of sockets and the plugs all reside above the disconnect body by between about 2-4 inches.

7. The plug and socket assembly of claim 1, wherein the first plug pair and the first socket pair are configured to electrically engage the load side before the line side.

8. The plug and socket assembly of claim 1, wherein the device is a molded case circuit breaker (MCCB), and wherein the socket assembly includes the first pair of line and load side sockets and second and third laterally spaced apart pairs of line and load side sockets, wherein the load side sockets are spaced vertically apart from while electrically connected to the electrical contacts in a top portion of the MCCB, and wherein the line side sockets are stationary and in electrical communication with a line side of a circuit of a respective unit.

9. The plug and socket assembly of claim 1, further comprising a frame having a racking portal on a front end portion thereof, the frame attached to the plug assembly and configured to move the plug assembly toward and away from the at least one pair of sockets.

10. The plug and socket assembly of claim 1, wherein the at least first pair of plugs have a common outwardly extending length to concurrently engage a corresponding socket pair.

11. The plug and socket assembly of claim 1, wherein the device is a molded case circuit breaker (MCCB), wherein the at least the first pair of plugs and the at least first pair of sockets include three sets or four sets of laterally spaced apart pairs, each pair for a different phase, and wherein the plug and socket pairs of each phase engage concurrently.

12. The plug and socket assembly of claim 1, wherein the device is a molded case circuit breaker (MCCB), wherein the at least first pair of plugs and at least one pair of sockets are both a plurality of laterally spaced apart pairs, each pair for a different phase.

13. The plug and socket assembly of claim 12, wherein the first pair of plugs and the first pair of sockets are associated with a center phase and are sized and configured to engage first before other pairs of the plug and sockets to thereby reduce racking forces on initial plug and socket contact.

14. The plug and socket assembly of claim 12, wherein the plug and socket assemblies are configured so that a load side of a corresponding plug and socket pair engages first and a line side second for three phases concurrently.

15. The plug and socket assembly of claim 1, wherein the device is a disconnect, wherein the at least first pair of plugs and at least first pair of sockets are configured as first, second and third pairs, the first, second and third pairs being laterally spaced apart pairs, each pair for a different one of three phases comprising first, second and third phases, and wherein the plug and socket assemblies are configured so that (i) a load side of corresponding plugs and sockets for each of the three phases engages first and a line side second and (ii) the socket and plug of the second (center) phase engage before sockets and plugs of the first and third phases.

16. A unit, comprising:
a device having a device body and electrical contacts;
a plug assembly with at least one pair of line and load side plugs facing outward;
a socket assembly with at least one pair of line and load side sockets aligned with the at least one pair of plugs and configured to releasably receive the at least one pair of plugs, wherein the plug assembly is separate from the disconnect body, including when the at least one pair of plugs reside in a respective pair of the line and load side sockets; and
a racking mechanism with a frame having a racking portal attached to a threaded rod and a plurality or retractable stabs in communication with stab wires, wherein the frame is attached to the plug assembly, and wherein, in operation, a lever engages the threaded rod though a portal inside the unit to retract the stabs from a bus and/or rack in and out the plug assembly.

17. The unit of claim 16, wherein the plug assembly comprises an insulated support that separates the line and load side plugs, wherein the frame of the racking mechanism has a racking portal on a front end portion and holds the insulated support at a back end portion thereof, and wherein the threaded rod can have a short actuation isolation distance of between 0.5 inches and about 0.75 inches to isolate the stabs from a bus in communication with the unit.

18. The unit of claim 16, wherein the device is a molded case circuit breaker (MCCB), wherein the at least one pair of plugs and at least one pair of sockets are both a plurality of laterally spaced apart pairs of respective line and load side plugs and sockets, each pair for a different one of three or four phases, and wherein the plug assembly and the socket assembly are aligned and configured so that a load side of a corresponding plug and socket pair engages first and a line side second (a) for all three phases concurrently or (b) for one phase first and at least one other phase sequentially thereafter.

19. The unit of claim 16, wherein the at least one pair of line and load side sockets are a plurality of laterally spaced apart pairs of line and load side sockets, wherein the at least one pair of plugs is a plurality of laterally spaced apart pairs, wherein the plugs and sockets all reside above the device body, wherein the load side sockets are electrically connected to contacts in a top portion of the device and reside spaced apart above the device by between about 2-4 inches, and wherein the line side sockets are stationary and in electrical communication with a line side of a circuit of the unit.

20. The unit of claim 16, wherein the plug assembly comprises an insulated support attached to a conductive bar holding the at least one pair of plugs, and wherein at least one plug of each at least one plug pair is above the insulated support and another at least one of the at least one plug pair is below the insulated support.

21. The unit of claim 16, wherein the at least one pair of the plug assembly has parallel, adjacent, side-by-side line and load side plugs.

22. A motor control center, comprising:
a cabinet with a plurality of compartments;
a power bus held by the cabinet; and
a plurality of units held in a respective compartment of the cabinet, the unit comprising:
- a disconnect having a disconnect body and electrical contacts;
- a plug assembly with at least one pair of plugs facing outward;
- a socket assembly with at least one pair of line and load side sockets aligned with the at least one pair of plugs and configured to releasably receive the at least one pair of plugs, wherein the plug assembly is a separate component that is spaced apart from the disconnect body; and
- a racking mechanism with a frame having a racking portal attached to a threaded rod and a plurality or retractable stabs in communication with stab wires, wherein the frame is attached to the plug assembly, and wherein, in operation, a lever engages the threaded rod to retract the stabs from a bus in the MCC cabinet and rack in and out the plug assembly.

23. The MCC of claim 22, wherein the plug assembly comprises an insulated support that separates line and load side plugs, wherein the frame is attached to the insulated support, wherein the bus includes a vertical bus, wherein the devices are molded case circuit breakers (MCCBs), and wherein the MCC cabinet has an isolator system in communication with the vertical bus with interlocks that resides electrically downstream of the MCCBs, and wherein the interlocks require that the MCCBs be open prior to activation of the isolator system.

* * * * *